US008118673B2

(12) United States Patent
Coleman et al.

(10) Patent No.: US 8,118,673 B2
(45) Date of Patent: Feb. 21, 2012

(54) COLLECTABLE CARD-BASED GAME IN A MASSIVELY MULTIPLAYER ROLE-PLAYING GAME THAT DYNAMICALLY FILTERS PLAYER COMMUNICATIONS

(75) Inventors: J. Todd Coleman, Austin, TX (US); Josef Hall, Cedar Park, TX (US); James L. Nance, Austin, TX (US)

(73) Assignee: KingsIsle Entertainment Incorporated, Dallas, TX (US)

( * ) Notice: Subject to any disclaimer, the term of this patent is extended or adjusted under 35 U.S.C. 154(b) by 319 days.

(21) Appl. No.: 12/475,382

(22) Filed: May 29, 2009

(65) Prior Publication Data
US 2010/0304856 A1   Dec. 2, 2010

(51) Int. Cl.
*A63F 9/24* (2006.01)
(52) U.S. Cl. ............. 463/31; 709/205; 709/206; 463/42
(58) Field of Classification Search .................... 463/31, 463/42; 709/206, 205
See application file for complete search history.

(56) References Cited

U.S. PATENT DOCUMENTS

| 7,458,894 B2 * | 12/2008 | Danieli et al. ................. 463/42 |
| 7,624,046 B2 * | 11/2009 | Galuten et al. ............... 705/26.1 |
| 2005/0192871 A1 * | 9/2005 | Galuten et al. ................. 705/26 |
| 2006/0058103 A1 * | 3/2006 | Danieli et al. ................. 463/42 |

* cited by examiner

*Primary Examiner* — Mohamed Wasel
(74) *Attorney, Agent, or Firm* — Fish & Richardson P.C.

(57) ABSTRACT

A massively multiplayer online role playing game (MMORPG) or, more specifically, a card-based MMORPG enables characters in a virtual world to collect cards representing specified actions or powers and presents three-dimensional (3D) elements to players representing one or more aspects associated with the characters and environment. This 3D display can, in some implementations, offer a real-time combat engine that processes the card-based events. The 3D display may also offer hanging effects that dynamically present state information associated with the respective character. Further, the MMORPG may offer a real-time responsive and flexible chat management system.

20 Claims, 26 Drawing Sheets

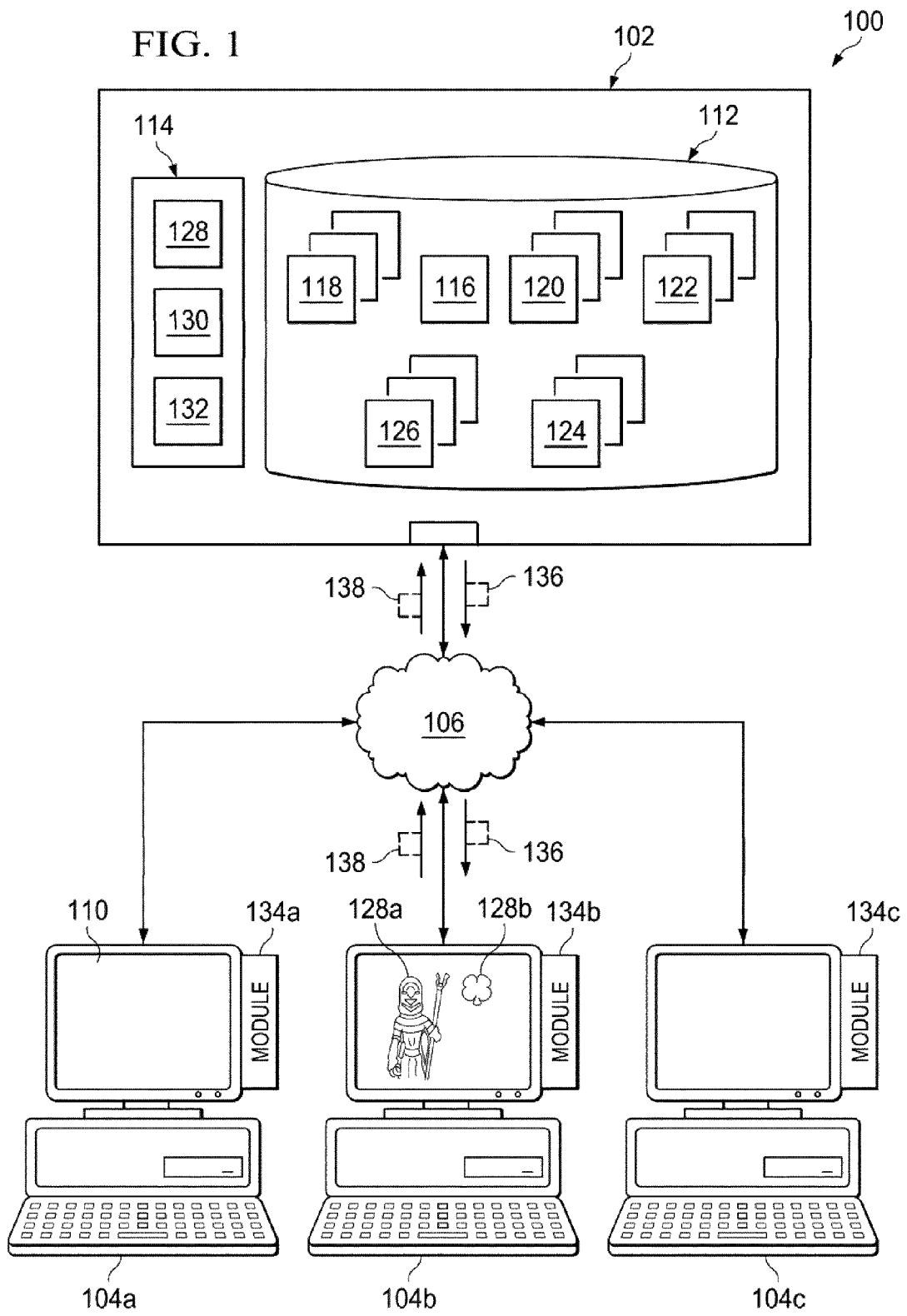

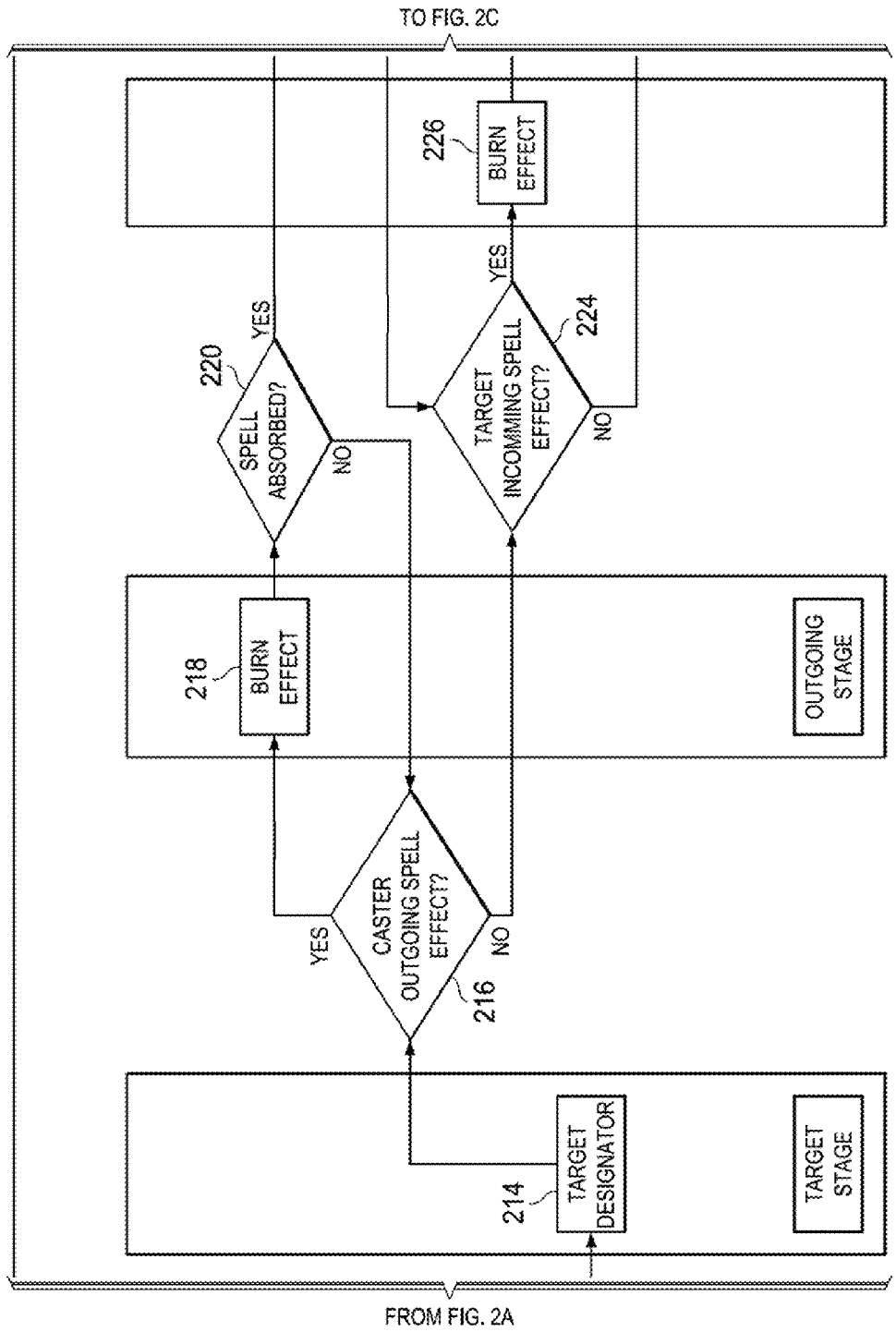

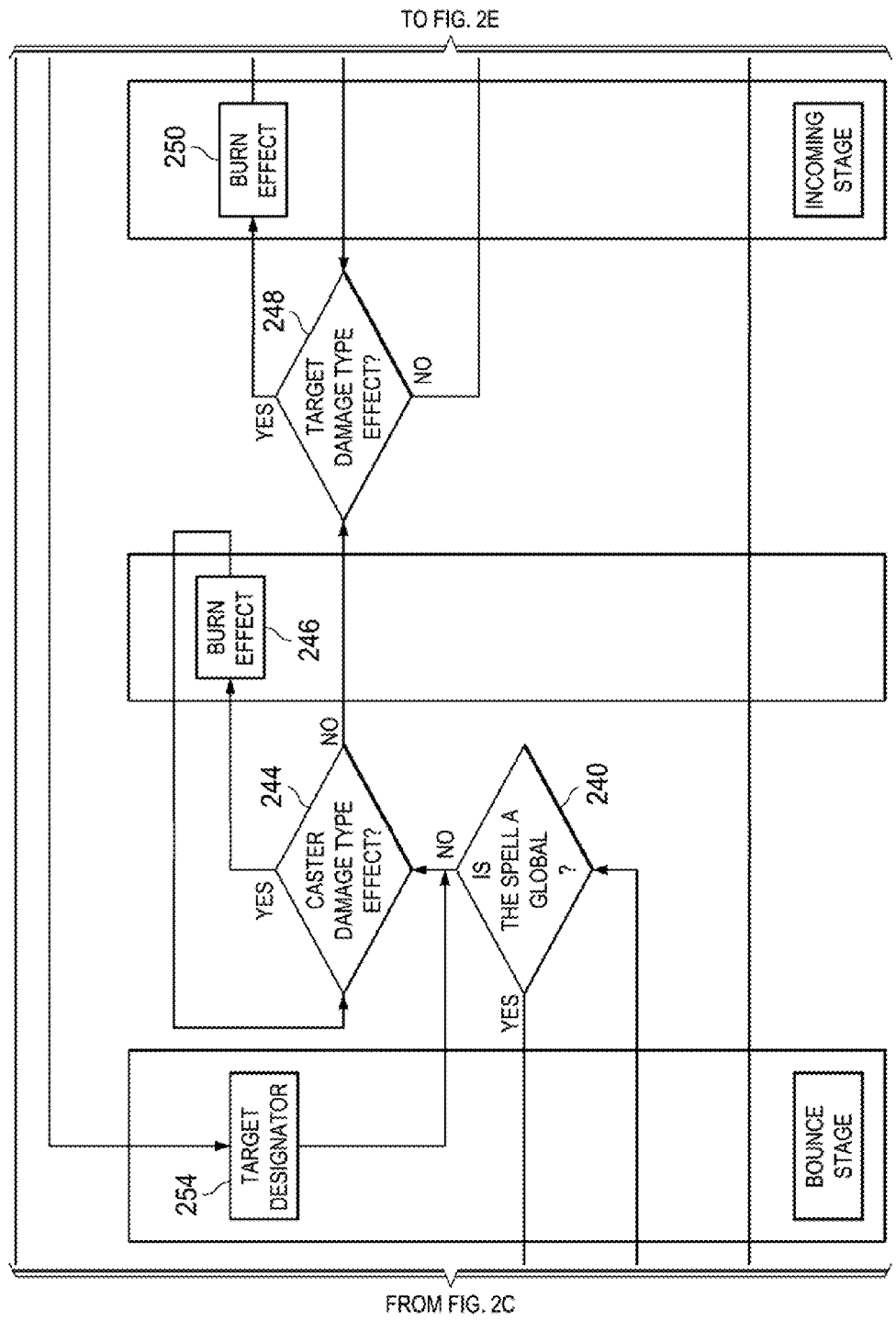

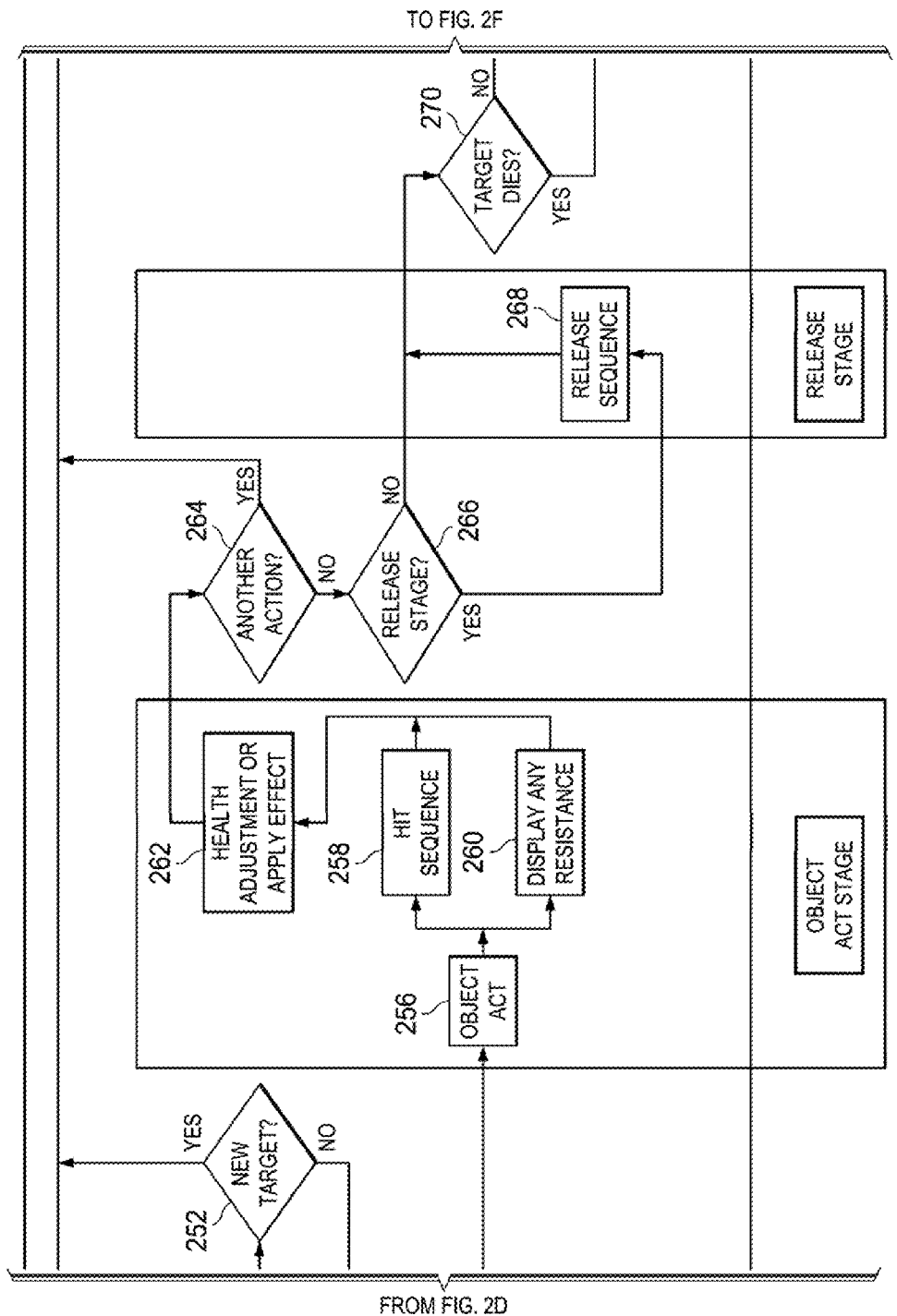

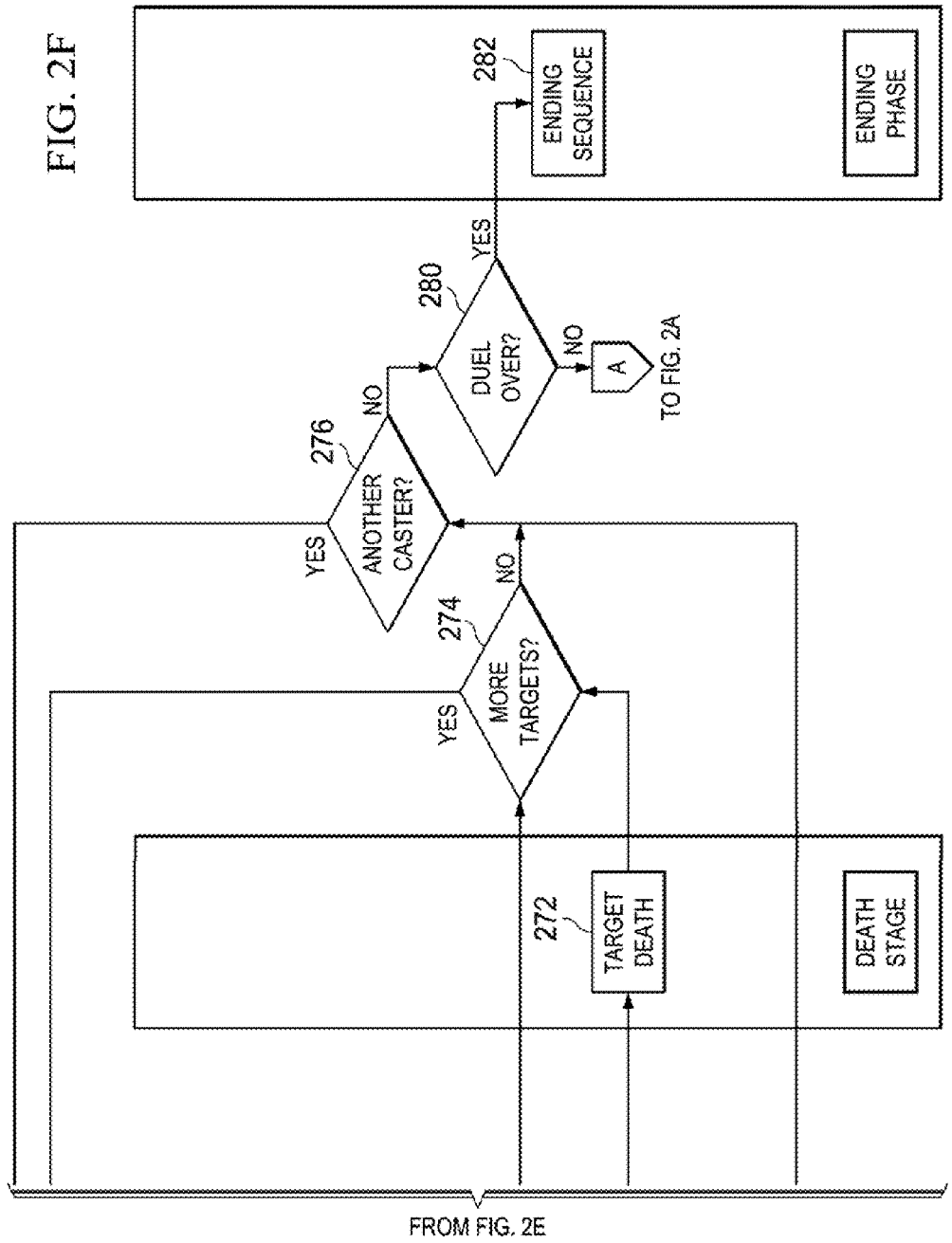

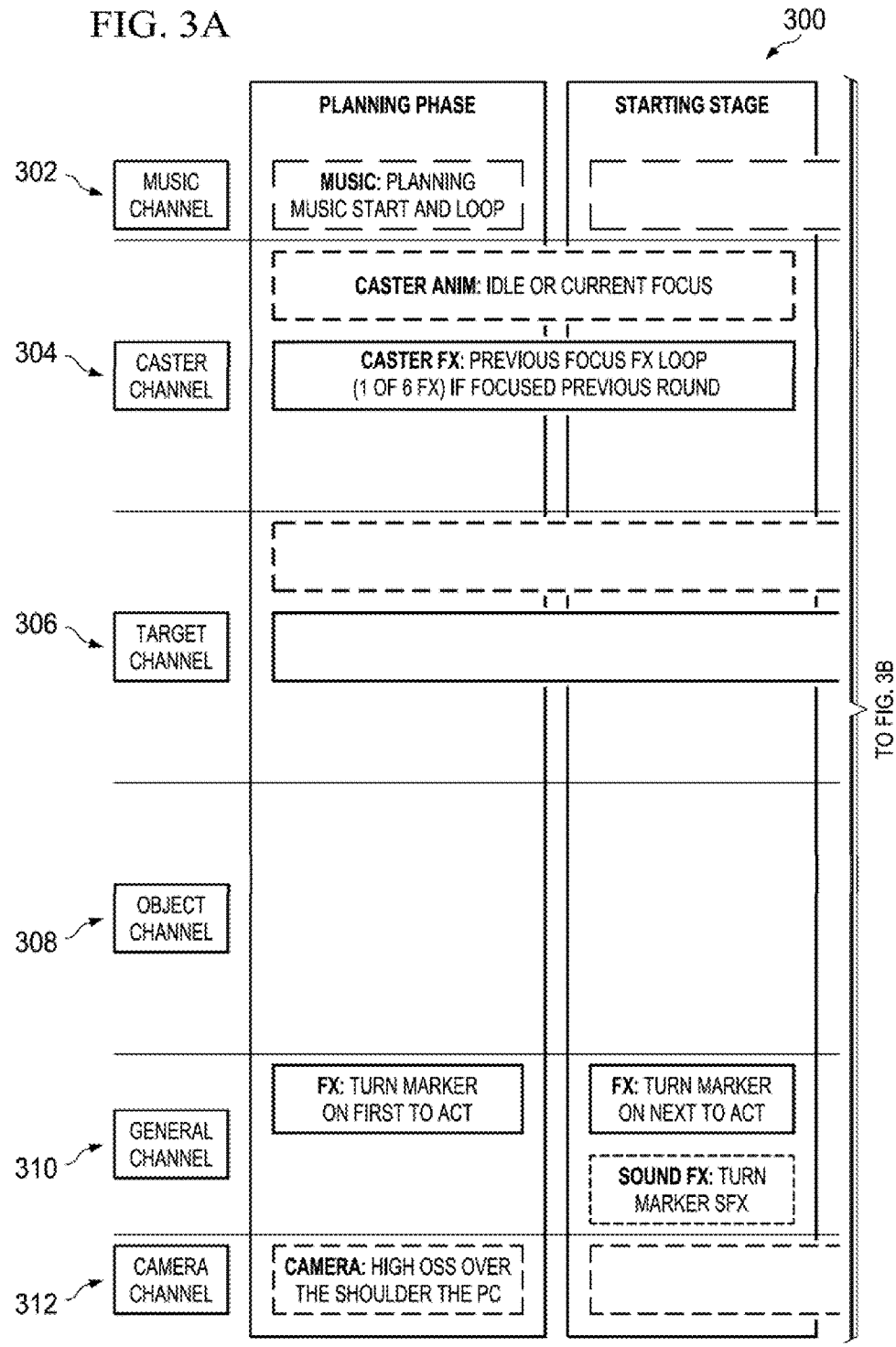

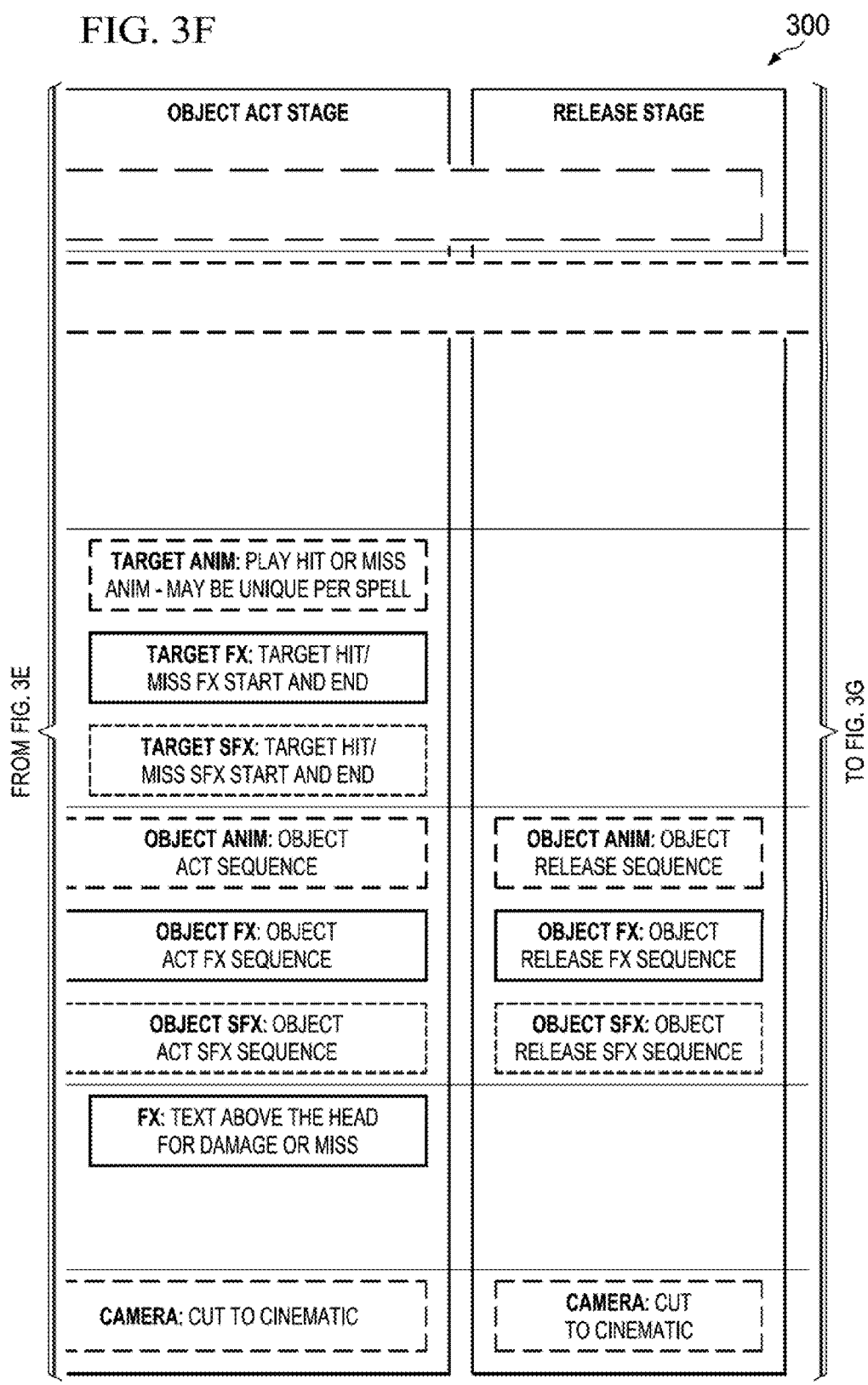

| SPEAKER | TEXT COLOR | DISPLAY |
|---|---|---|
| EASY CHAT | | [NAME] SAYS: |
| FILTERED CHAT | | [NAME] SAYS: |
| WHISPER/TELL | | [NAME] WHISPERS: *OR* TO [NAME]: |
| SECURE CHAT | | ONLY A COLOR CHANGE |

COLLECTABLE CARD-BASED GAME IN A MASSIVELY MULTIPLAYER ROLE-PLAYING GAME THAT DYNAMICALLY FILTERS PLAYER COMMUNICATIONS

TECHNICAL FIELD

This disclosure relates to evaluating systems, software, and computer implemented methods and, more particularly, to presenting gaming aspects in three dimensions.

BACKGROUND

A massively multiplayer online role playing game (MMORPG) is an online computer or console game in which a large number of players interact with one another in a virtual world. As in other role playing games (RPGs), players assume the role of a character and take control over most of that character's actions. The virtual world may be a fantasy setting, a science fiction universe, or the old west, for example. The popularity of multiplayer games may trace back to Dungeons & Dragons™ or even tabletop war games. "Dungeons & Dragons" is a registered trademark of Wizards of the Coast. The beginning of massively multiplayer online role playing games may be traced back to the multi-user dungeon (MUD) internet games, which were text-based multiplayer games typically using a command line interface. However, with the rising acceptance of personal computers, as well as increased graphical capabilities of personal computers and video game consoles, massively multiplayer online role playing games have become wildly popular around the world. In fact, part of the draw of massively multiplayer online role playing games is that players from any continent can typically be online at any given time.

MMORPGs distinguish from single-player or small multi-player role playing games by the game's persistent world. The persistent world is hosted by one or more servers and the state of the world continues to exist and evolve even when a given player is not logged in. Persistent worlds may also include non-player characters (NPCs), marketplaces, auction houses, buildings, animals, monsters, vehicles, etc. This results in a game world that is far more dynamic, diverse, realistic, and immersive than those of other games.

Players of persistent world games tend to invest a great deal of time in their online characters. The player is considered online when the player is logged into the game server through a game client. Conversely, a player is considered offline when the player is not logged into the game server through a game client. A typical player performs tasks, such as completing quests, practicing skills or crafts, obtaining items, fighting monsters, buying or selling items, to improve the attributes or status of the character.

SUMMARY

This disclosure generally describes a massively multi-player online role playing game (MMORPG) or, more specifically, a card-based MMORPG that enables characters in a virtual world to collect cards representing specified actions or powers and presents three-dimensional (3D) elements to players representing one or more aspects associated with the characters and environment.

For example, a computer program product for managing an online game is stored on a tangible computer-readable medium and comprises instructions operable when executed to cause a processor to identify, for each of a plurality of characters in an online game, cards collected by an associated character in a virtual world, where each card represents an action executable by the associated character. The instructions further present the plurality of characters as three-dimensional figures in the virtual world and receive a selection of at least one card for each of the plurality of characters during duels in the virtual world. The card indicates an action executed in the virtual world. The instructions further cause the processor to automatically determine, for each of the plurality of characters, an effect of the at least one selected card and present, in real time, a physical manifestation of the effect associated with each of the plurality of characters using one or more three-dimensional elements in the virtual world.

In another example, a computer program product for presenting information in an online game using computer-readable instructions is stored on a tangible computer-readable medium and comprises instructions operable when executed to cause a processor to identify, for one of a plurality of characters in an online game, state information associated with the one of the plurality of characters during a combat in a virtual world; present, in the virtual world, at least one three-dimensional object representing the state information, the at least one three-dimensional object presented proximate the one of the plurality of characters in the virtual world; receive information updating the state information of the one of the plurality of characters; and dynamically modify, in real time, a presentation of the at least one three-dimensional object to represent the updated state information. In some situations, the state information includes a current state of the combat. Often, the particular three-dimensional object is viewable by each client associated with the plurality of characters in the virtual world.

In a further example, a computer program product for evaluating combat in an online game using computer-readable instructions, the computer program product is stored on a tangible computer-readable medium and comprising instructions operable when executed to cause a processor to receive from a plurality of characters in an online game selections of cards representing actions performed on targets. The instructions identify values of parameters associated with the plurality of characters and the targets and determine effects on the targets based, at least in part, on the identified values and the performed actions. The instructions further cause the processor to automatically update one or more attributes of the targets in accordance with the determined effects.

In yet another example, the computer program product for chatting in an online game using computer-readable instructions, the computer program product stored on a tangible computer-readable medium comprises instructions operable when executed to cause a processor to identify a plurality of characters in an online game and associate chat levels and identify one or more rules for evaluating dialogue associated with the plurality of characters. The instructions further receive dialogue from one of the players controlling one of the plurality of characters and filter the received dialogue based, at least in part, on the identified chat levels and the one or more rules. In some cases, filtering comprises identifying an entered word as a word to remove prior to presentation to other characters and dynamically updating the word selected for removal with an approved word for presentation to other characters in the virtual world. Filtering the received dialogue also comprises comparing the received dialogue to a list of profane terms associated with one or more specified chat levels and replacing prohibited terms with character strings prior to presenting the dialogue to other characters in the one or more specified chat levels. Each of the plurality of characters presents a graphical element indicating a chat level associated with the player. Filtering the received dialogue comprises comparing the received dialogue to a list of unacceptable terms associated with a particular chat level; dynamically updating one or more attributes of the received dialogue based, at least in part, on the received dialogue matching the acceptable terms so that the particular player can view the unacceptable term in real-time; and automatically presenting filtered text, based on the unacceptable term, to other players as the dialogue is received from particular player. One updated attribute includes a new color for the unacceptable term.

While generally described as computer implemented software that processes and transforms the respective data, some or all of the aspects may be computer implemented methods or further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

DESCRIPTION OF DRAWINGS

FIG. 1 is a block diagram illustrating an example game system in accordance with some implementations of the present disclosure;

FIGS. 2A-F are a flow chart illustrating an example method for executing duels between players;

FIGS. 3A-G are a chart illustrating different channels associated with a duel;

DETAILED DESCRIPTION

Figure 2A:
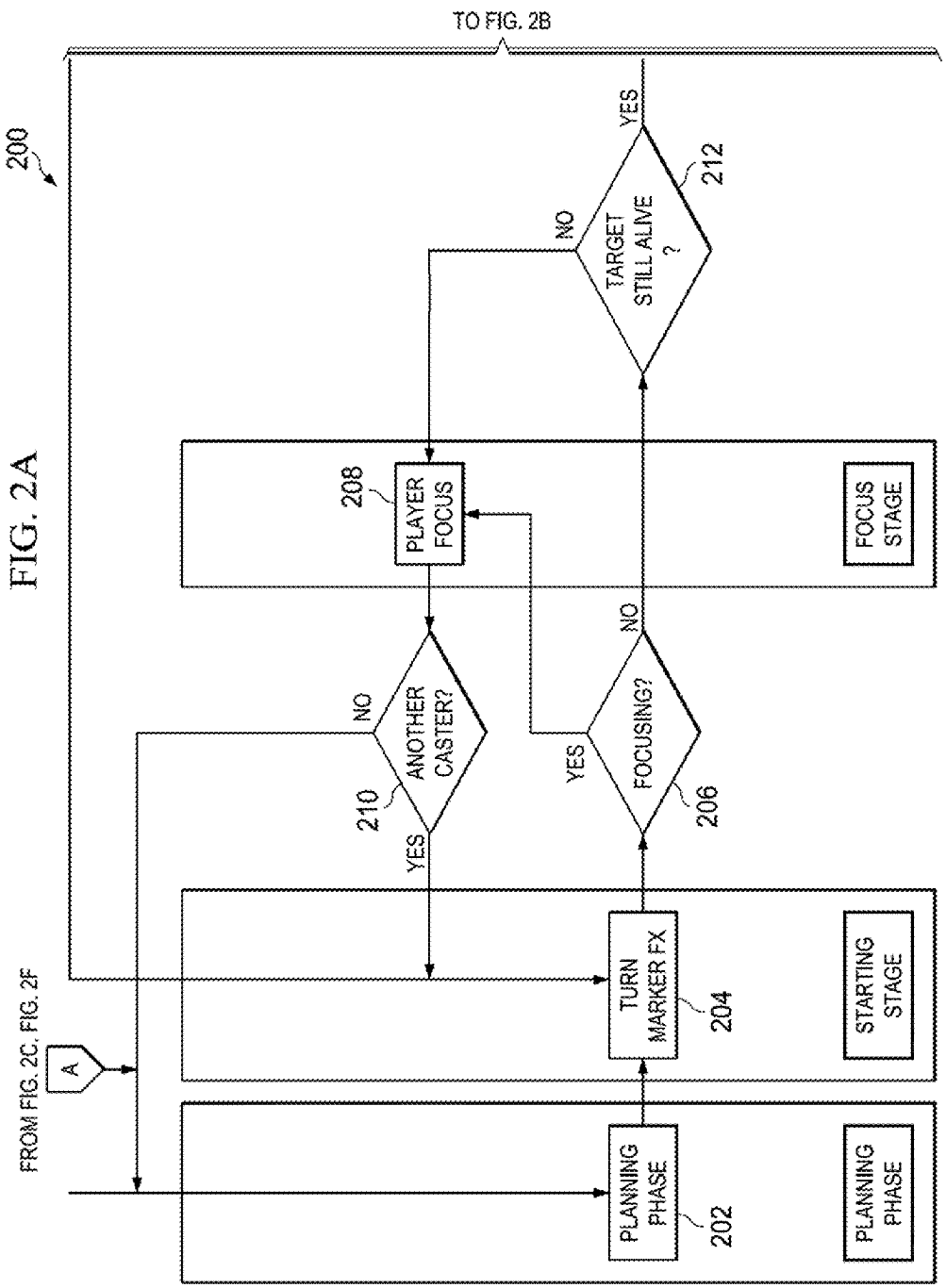
Figure 2C:
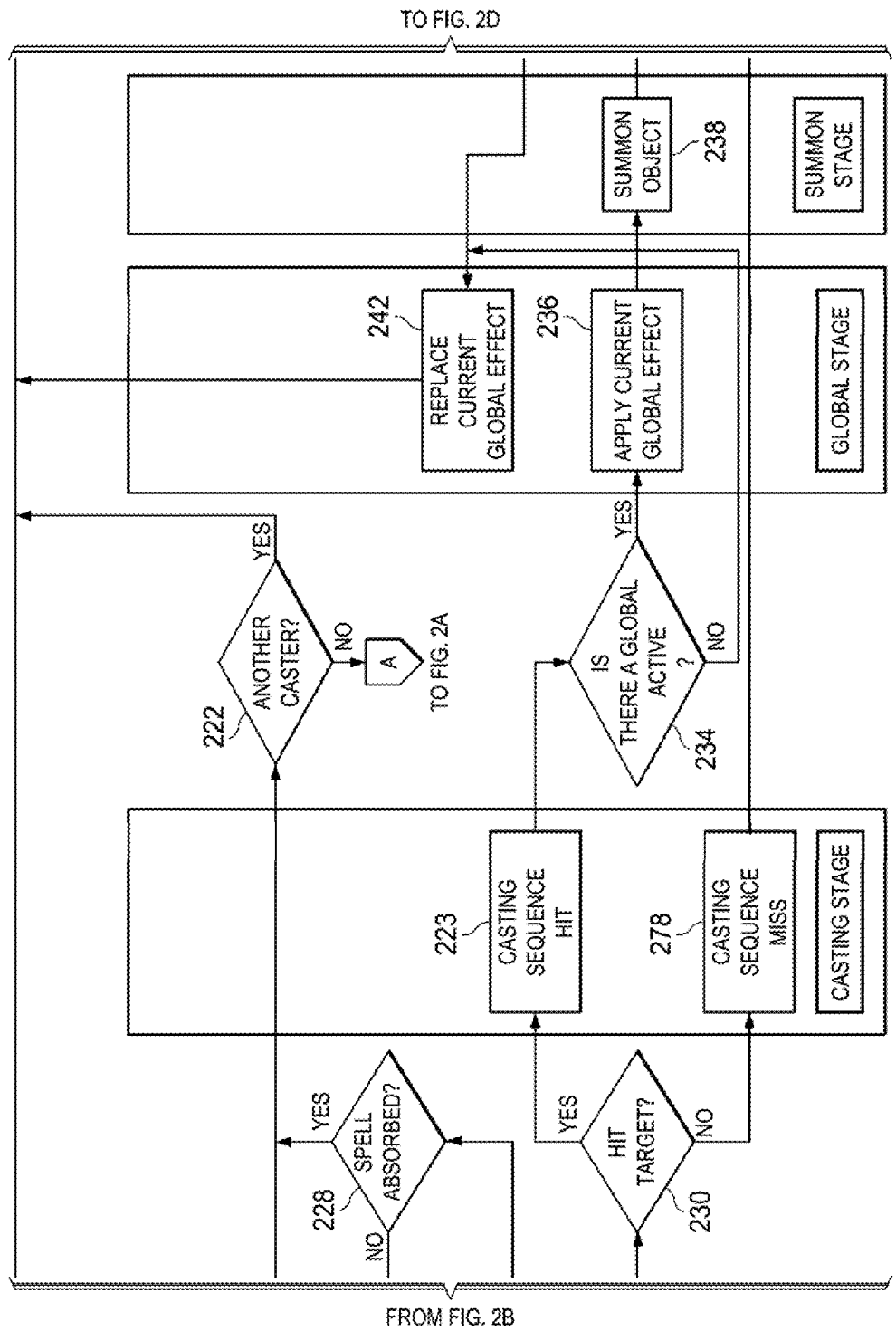
Figure 3B:
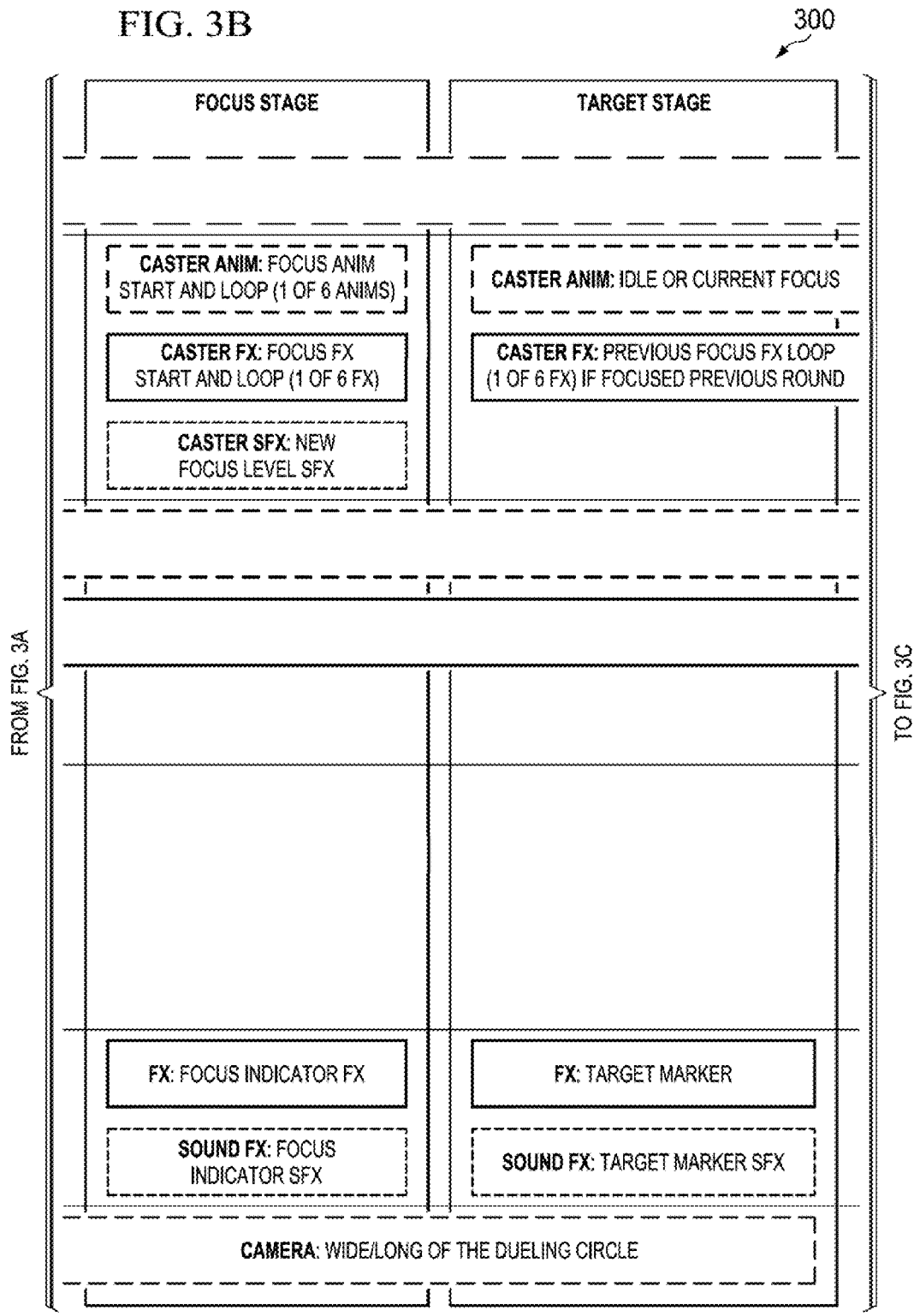
Figure 3C:
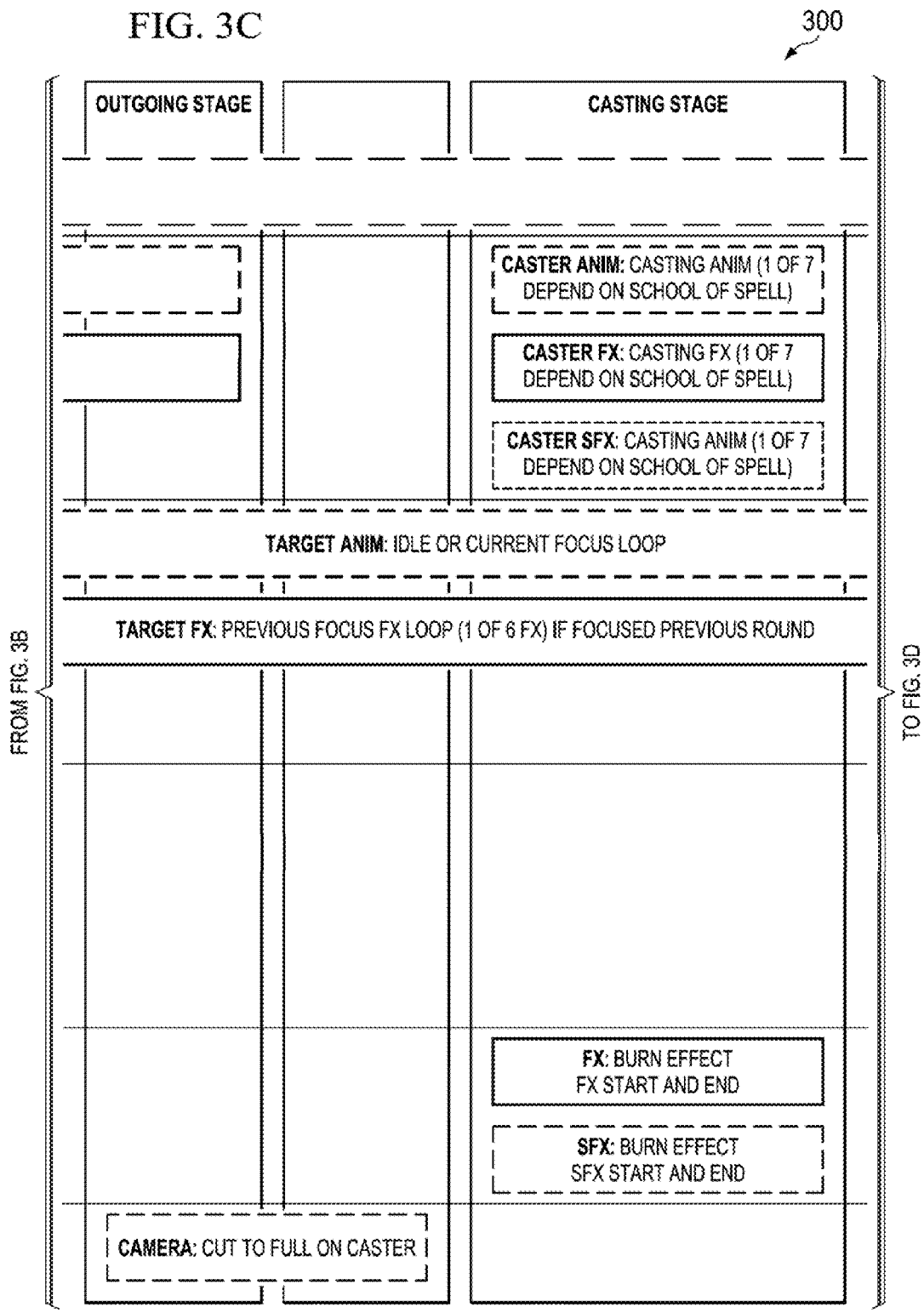
Figure 3D:
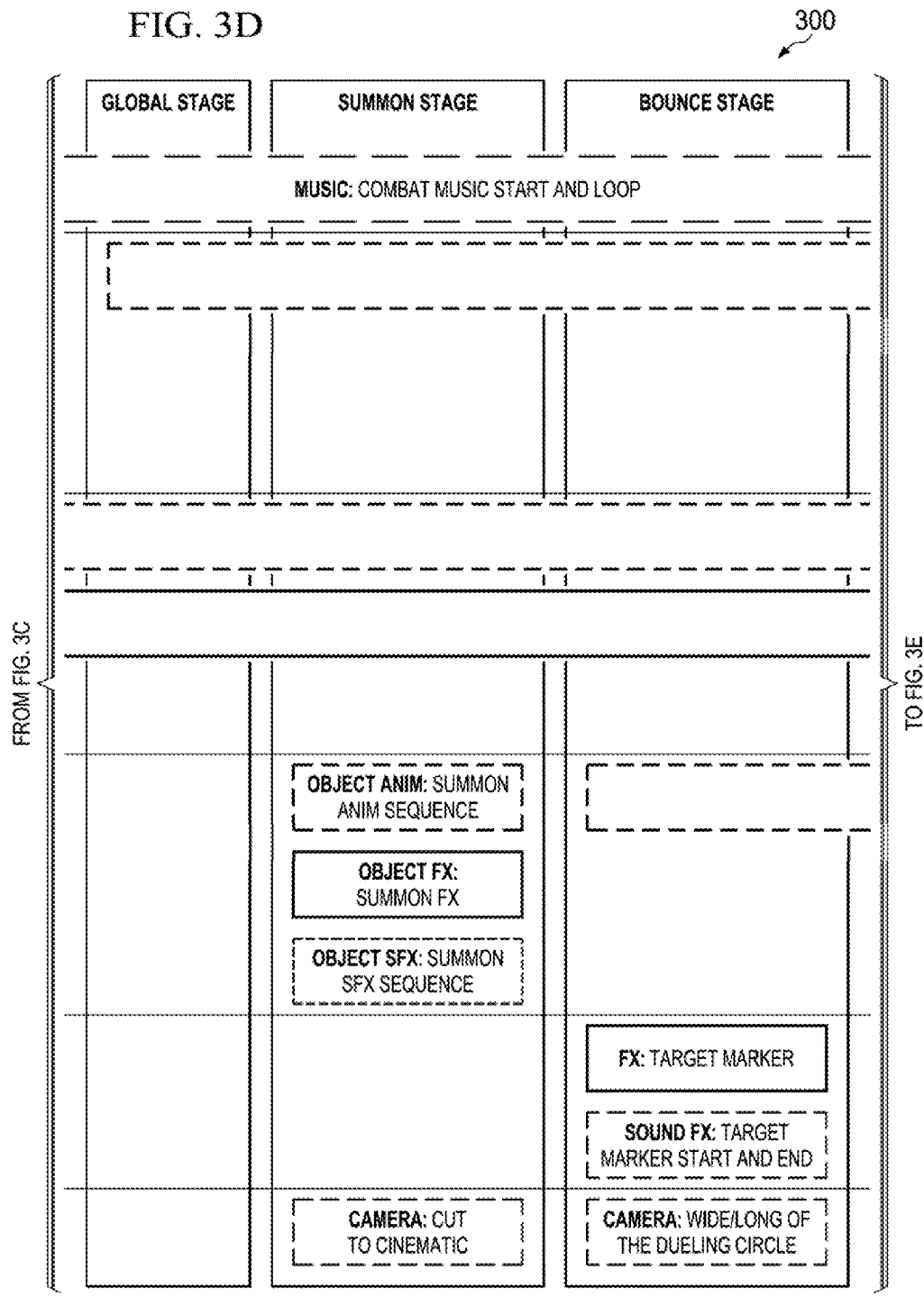
Figure 3E:
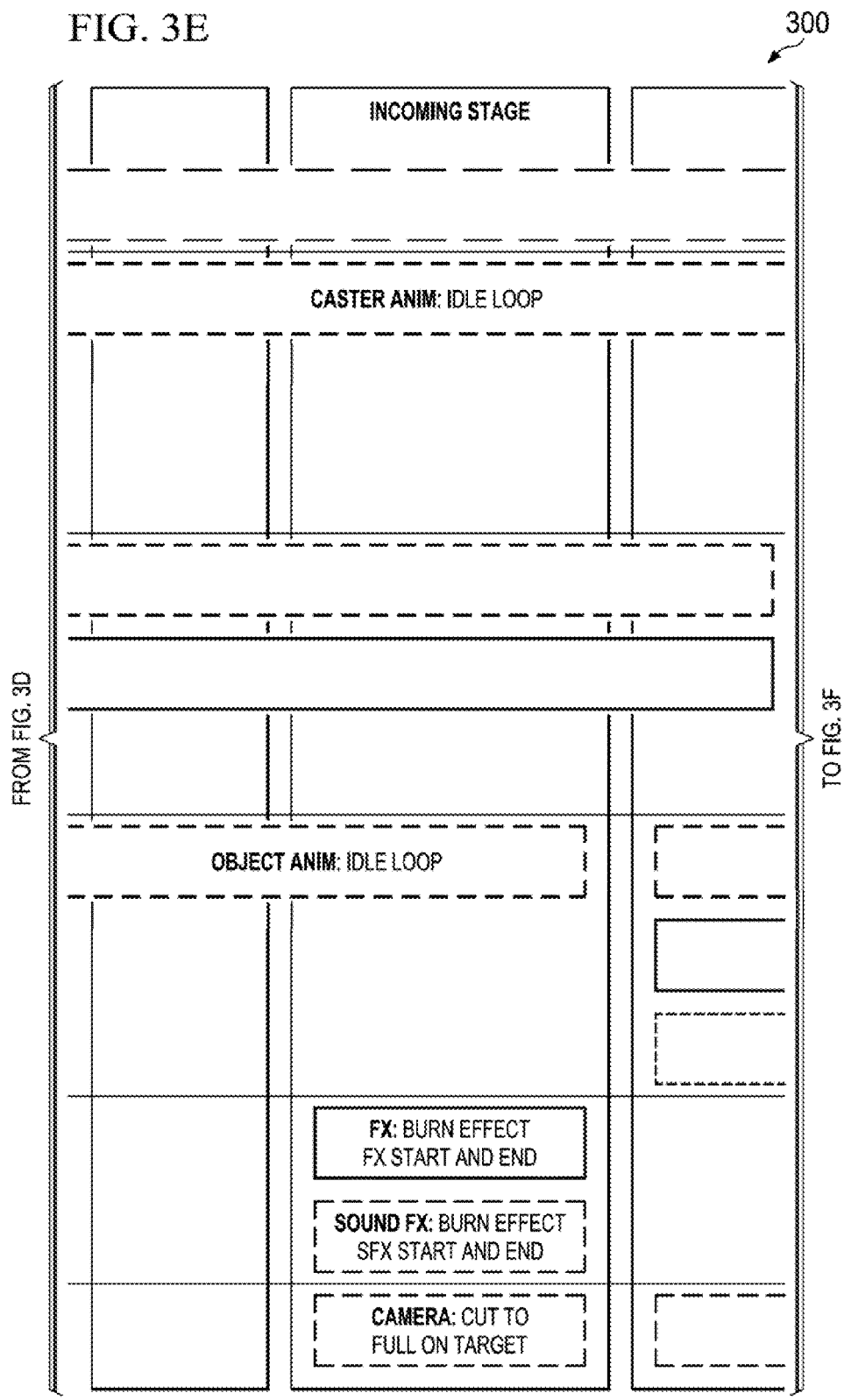
Figure 3G:
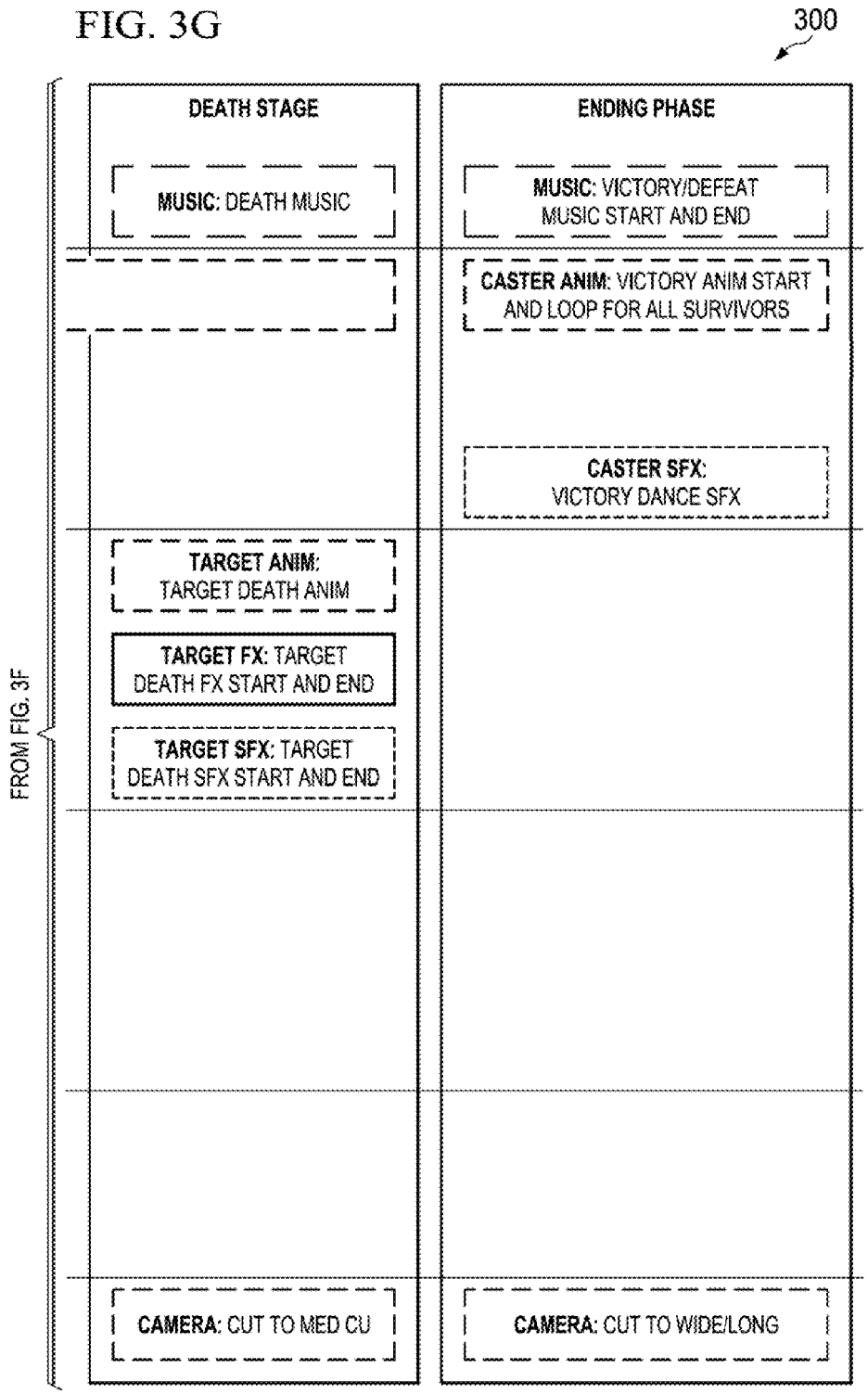
Figure 4A:
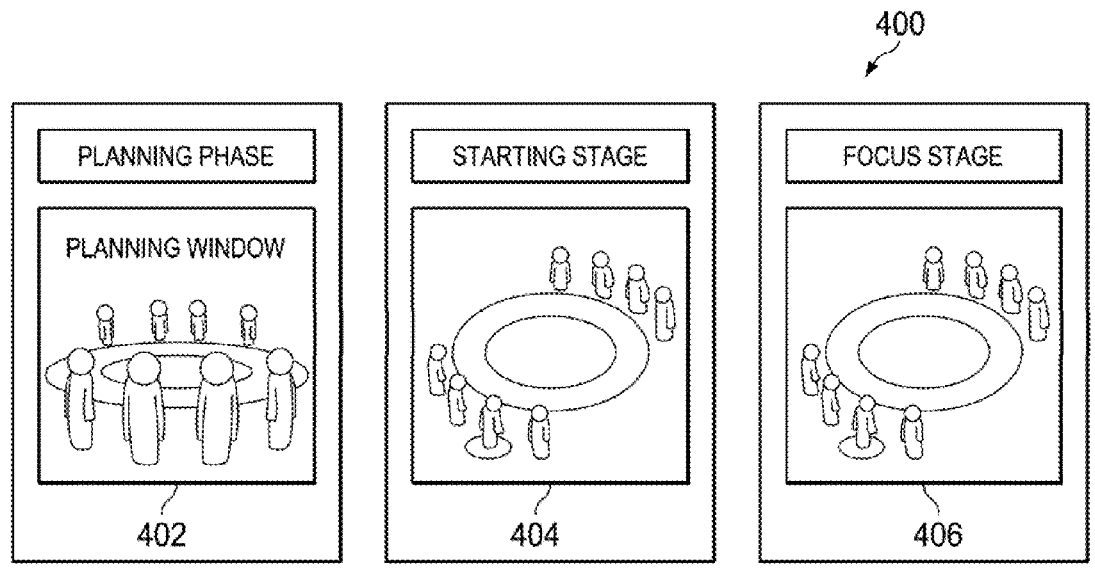
FIGS. 4A-F are a pictorial chart illustrating an example sequence of images associated with a duel.
Figure 4B:
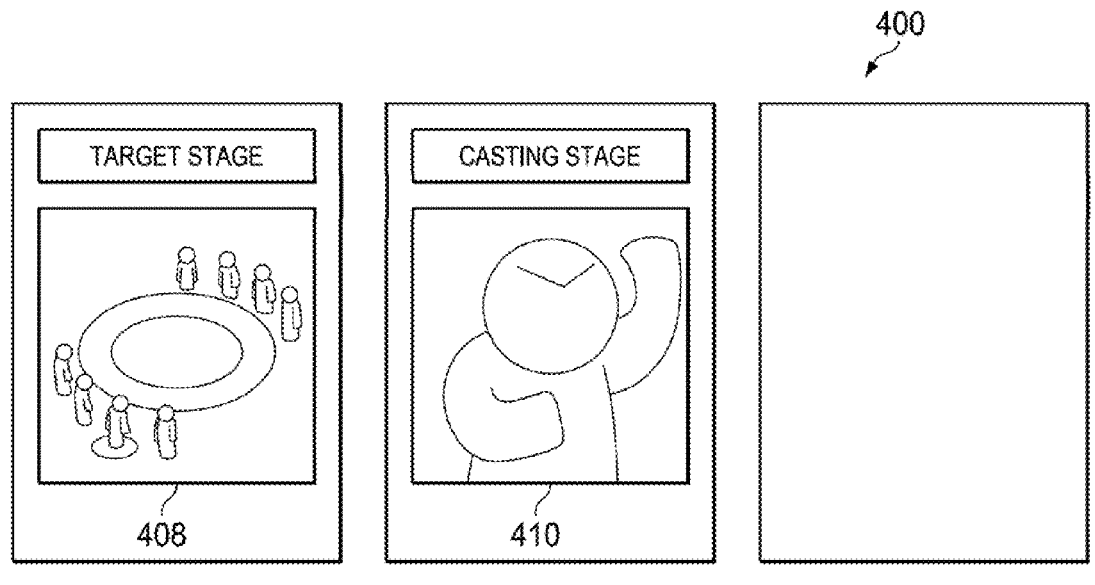
Figure 4C:
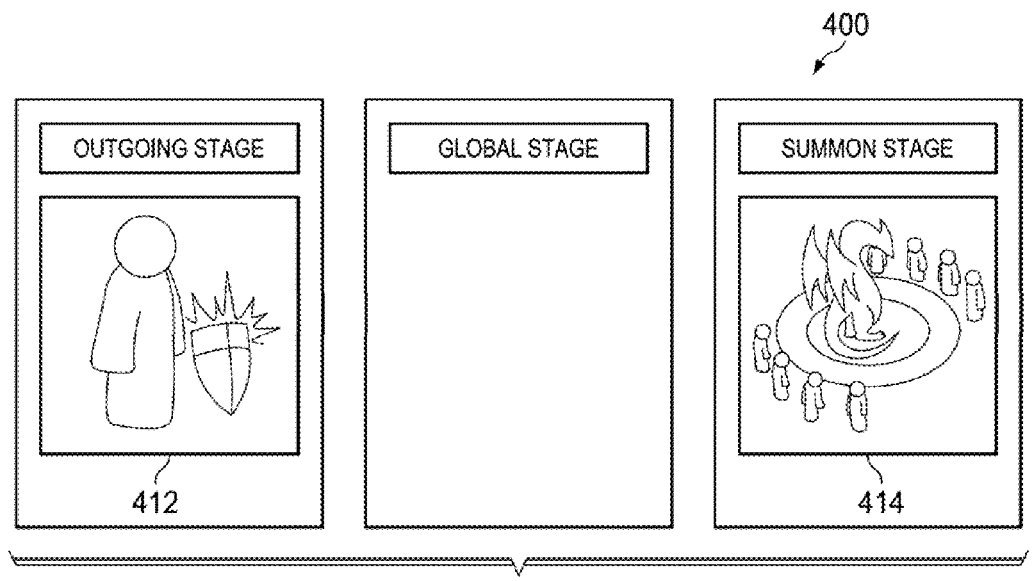
Figure 4D:
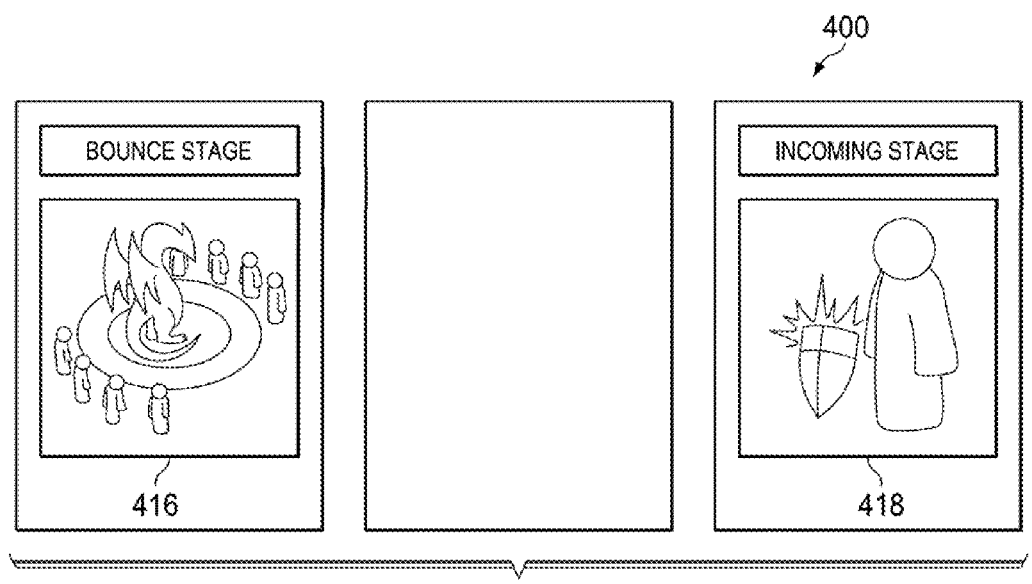
Figure 4E:
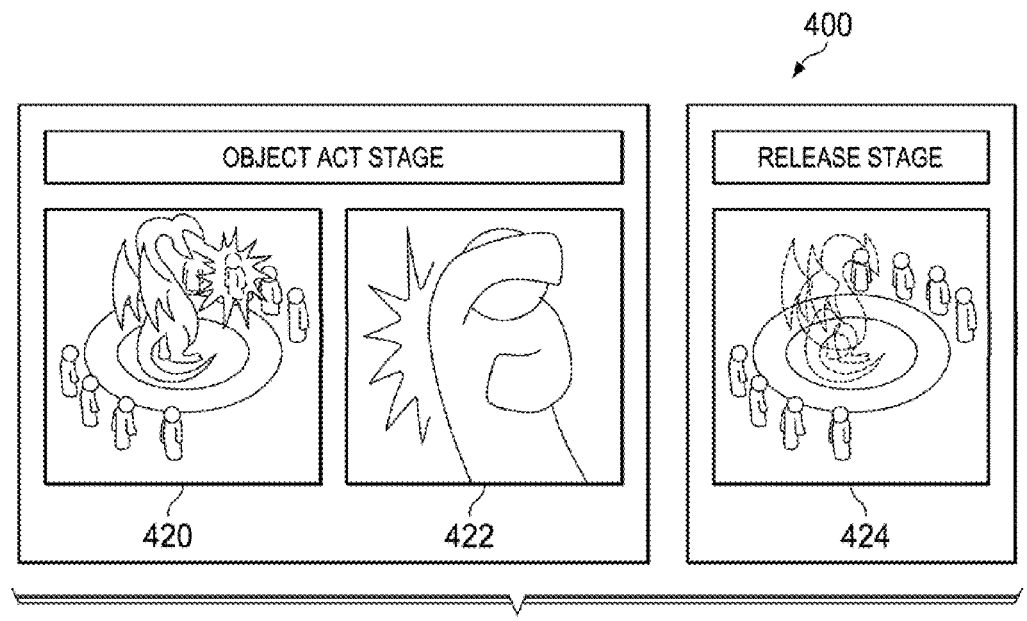
Figure 4F:
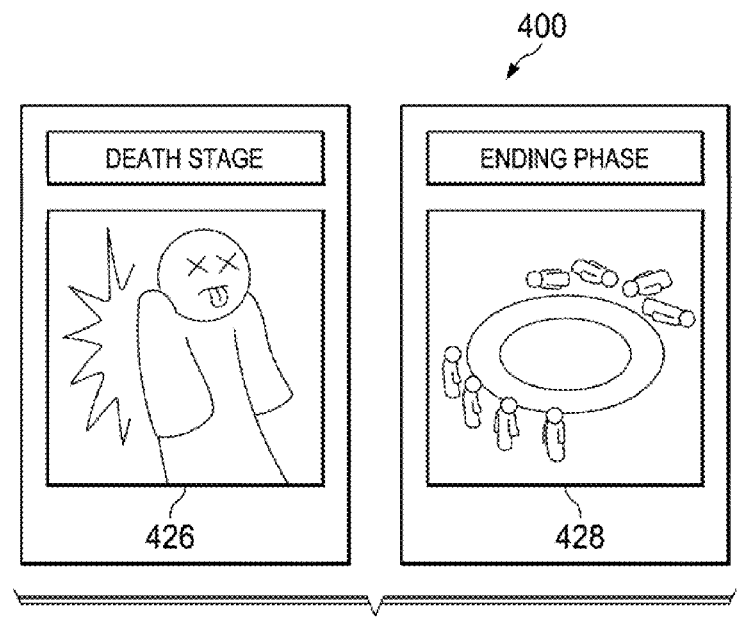

This disclosure generally describes a MMORPG or, more specifically, a card-based MMORPG that enables characters in a virtual world to collect cards representing specified actions or powers (e.g., spells) and presents three-dimensional (3D) elements to players representing one or more aspects associated with the characters and environment. To illustrate these concepts, the disclosure illustrates an example game system 100 for executing, evaluating, or otherwise processing user actions in a collectible-card MMOG in a 3D environment. A collectible card game typically allows players to collect playing cards that are then used in play for respective characters. It will be understood that "player" and "character" may be used interchangeably in certain circumstances as appropriate. In some implementations, the system 100 may evaluate duels between wizards and/or monsters in an MMOG based, at least in part, on the cards played or selected and one or more characteristics associated with the dueling characters and/or environment. For example, playing cards can represent actions (e.g., attacks, spells) associated with combat between one or more characters or monsters. Within system 100, the playing cards may represent spells that a user may select and execute in real time. Real time generally means that a user selection and action in the MMOG are temporally proximate (e.g., 500 milliseconds, 1 sec, 5 sec) such that the events appear as simultaneous or appear as substantially simultaneous. Based, at least in part, on the evaluation, the system 100 may present actions and character data using 3D and 2D elements. In the wizard-based examples, the system 100 may present 3D elements representing a spell cast and 3D elements representing the effect on character attributes (e.g., health, charms, wards, curses, traps, globals, etc). In some implementations, the system 100 may execute one or more of the following: identify characters, played cards and attributes of the dueling characters; three-dimensionally present information associated with characters in a 3D environment; receive information identifying actions selected by one or more users in combat such as selecting cards presenting spells; evaluate the effect of the actions based, at least in part, on a plurality of variables associated with the users (e.g., health, charms); present results or effects of the evaluation using 3D elements; filter chat between players based on, for example, chat levels associated with players (or other known information such as age of the particular user, etc.); and/or other actions. In executing a subset of these actions, the system 100 may manage a collectible card MMOG in a 3D environment in real time. While the following example description is centered around dueling wizards and cards representing spells, the gaming system 100 can cover other topics associated with characters combating or otherwise competing, such as military games, sports games, social games and/or other games.

As previously mentioned, the system 100 is described in the context of processing user actions in a collectible card MMOG based on fantasy characters such as wizards and monsters. For example, the system 100 may manage a virtual world that includes one or more of the following: receiving selections from users that design characters; identifying cards that are collected by players in connection with interacting with the virtual world; evaluating actions selected by users such as playing cards during a duel; updating character aspects based, at least in part, on the evaluated actions; presenting dialogue entered or otherwise selected by players; and/or process other aspects of the game. In connection with players selecting characters, the system 100 may enable players to design wizards by selecting, for example, hair styles, hair colors, facial structures, eye colors, skin colors, and clothing designs and select a wizard school. In some implementations, the system 100 may assign or otherwise associate cards to characters in response to at least one or more events such as completing a task or quest. In the wizard implementations, the collectible cards may represent spells such that the wizards may cast spells in, for example, a duel with other players or resources found through the course of gameplay. The spells may include damage, healing, health drain, shield, trap, card enhancements, manipulation, and/or other spells. To convey attributes of a spell to a player, the system 100 may present one or more symbols or icons such as a fist, to indicate the card is a damage spell and a fire symbol to indicate the card is a fire-based spell. Alternatively, or in addition, the system 100 may present numbers indicating, for example, a cost for casting the spell, a probability of hitting the target, and effect on the target (e.g., 400 damage).

In response to selecting cards, the system 100 may determine a cost for playing the cards and an effect on players. The cost for selecting a card or casting a spell may include deducting points from a power level ("mana"). For example, the system 100 may indicate a cost ("pip") for casting a spell and deduct the pip from the character's power level. The effect may include, for example, damage to a player's health level, increasing a player's health, shielding against future spells cast on a target, enhancing an effect of another spell, and/or other effects associated with dueling fantasy characters. In some implementations, the system 100 may determine experience points associated with playing different types of cards. For example, spell types may include fire, storm, wind, myth, ice, life, death, balance, and/or other concepts. In response to experience points for a spell type exceeding a threshold, the system 100 may provide additional spells of that type (or another) to the character. In response to winning a duel or completing a quest, the system 100 may provide additional spells randomly to the player. In the process of interacting with the virtual world, the system 100 may present dialogue or chat entered or otherwise selected by players, non-player characters or monsters. In some implementations, the system 100 may filter chat based, at least in part, on the entered content and/or a chat level associated with players.

The system 100 may represent a character's physical and/or mental health using life points. For example, the system 100 may initially assign 500 life points to a character, which may have an upper limit (e.g., 2000). This upper limit can be different for each player and character. By participating in duels, the system 100 may deduct health points from players to represent damage. In the event a player's life points are reduced to zero, the system 100 may execute one or more events such as animating the character as tired, lacking energy or unconscious, presenting depressing music or sounds effects, presenting an announcement to all players, returning the player to a hub zone, and/or other events. Other players may cast healing spells to increase the life points of another player with low or zero health points. In some cases, the system 100 may receive a selection to flee a duel. In regards to healing, the system 100 may enable the players to heal over time (e.g., 10% per 30 sec), while logged out of the game, virtually paying a healer a sum of gold, and/or others.

During combat or dueling between characters, the system 100 may identify different stages such as planning stage, summon stage, object act stage, death stage, and ending stage. In connection with the planning stage, the system 100 may present competing players in a circle or combat circle that may be defined by a point, a radius, and an orientation. The orientation of the players may define initial placement of Team A and Team B. The system 100 may process combat areas as invisible to the players and may be used to specify an entry range such that characters (e.g., wandering monsters) can be added to duels if they are within the range. In some implementations, the system 100 may disable one or more user actions during combat such as movement, trading, wearing or removing equipment and/or teleporting. During the planning stage, the system 100 may include a universal timer that provides a period of time enabling players to select cards to play during a round. For example, the planning phase may be a 30-second time period for players to select actions at the beginning of each round. In some implementations, the system 100 may present a Graphical User Interface (GUI) to each player enabling them to select one or more cards representing spells to be executed, combined or discarded during the current round. The system 100 may prevent players from acting during a round if an action is not selected within the time period. During the summoning phase, the system 100 may execute the combat round based on the selected spells and parameters associated with the players. In the event that an executed spell summons an object (e.g., monster, hanging effect), the system 100 may present the object in the combat circle and a sequence displaying the object acting on the target of the spell. In some implementations, the system 100 may subtract or add health to a target based, at least in part, on a type of spell such as combat effect, damage, and healing spell. During a burn outgoing handing effects stage, the system 100 may implement selected charms and/or curses to modify outgoing spells. During a burn incoming hanging effect stage, the system 100 may implement selected wards and/or traps as effects which can modify incoming spells. During a death stage, the system 100 may return the player to a specified area (e.g., starting area) in response to a player's life points reaching zero. During the ending stage, the system 100 may add a pip to a player for each round of combat including the player. In addition, the system 100 may present the player with a specified amount of experience and/or items in the event that a player wins a duel. In addition, the system 100 may complete one or more goals or quests in the event that a player wins a duel. While these stages are for illustration purposes only, the system 100 may identify some, all or none of these stages without departing from the scope of this disclosure.

Turning to the example implementation illustrated in FIG. 1, the system 100 includes a server 102 and clients 104*a-c* communicably coupled through a network 106. In this implementation, the clients 104 include a GUI 110 for displaying information associated with an MMOG and the associated collectible card-based combat system. The server 102 includes memory 112 and processor 114. The memory 112 locally stores a game application 116 that manages a collectible-card MMOG, user files 118 that identify information associated with a user (e.g., character, cards, status), 3D rules 120 that identify directives used to present 3D elements, quest module 122 that manages tasks and navigation in the virtual world, combat rules 124 that identify directives for evaluating combat between players and/or monsters, and chat rules 126 for identifying directives for dialogue between players. The processor 114 includes a presentation engine 128 for presenting graphical elements 128*a* and 128*b* through the GUI 110, combat engine 130 for evaluating user actions during combat, and a chat engine 132 for managing dialogue between users based, at least in part, on the chat rules 126. While the illustrated implementation includes the different modules in the server 102, a subset of these modules may reside in the client 104 without departing form the scope of this disclosure. For example, the client 104 may include the presentation engine 128 and the 3D rules 120.

As mentioned above, the system 100 includes, invokes, executes, references, or is communicably coupled with the server 102. The server 102 can include any software, hardware, and/or firmware configured to process gaming actions using the game application 116. For example, the server 102 may be a computing device that executes actions for thousands of users such as, for example, spells cast in a plurality of different duels. In this example, the server 102 may support hundreds or thousands of users simultaneously. Typically, the server 102 can continuously process many thousands of selected actions and/or communicate with different user devices (e.g., clients 104). FIG. 1 provides merely one example of computers that may be used with the disclosure. Each computer is generally intended to encompass any suitable processing device. For example, although FIG. 1 illustrates one server 102 that may be used with the disclosure, system 100 can be implemented using computers other than servers, as well as a server pool. Indeed, server 102 may be any computer or processing device such as, for example, a blade server, general-purpose personal computer (PC), web server, Windows Server, Unix-based computer, handheld device or smartphone, or any other suitable device. In other words, the present disclosure contemplates computers other than general purpose computers, as well as computers without conventional operating systems. Server 102 may be adapted to execute any operating system including Linux, UNIX, Windows Server, or any other suitable operating system.

In the illustrated implementation, the server 102 can execute the game application 116 at any appropriate time such as, for example, in response to requests or inputs from the clients 104 or any appropriate computer system coupled with network 106. The game application 116 is any suitable application software running on the server 102 that manages a card-collectible MMOG in a 3D environment. In some examples, the game application 116 may manage a persistent world, such as a virtual world, that continues to exist even after a user exits the world and/or that user-made changes to the environment state may be permanent. The game application 116 may support a plurality of users (e.g., thousands) submitting a plurality of actions (e.g., millions of actions per day). This example game application 116 may execute one or more of the following: receive and process login and logout requests, receive information identifying movement actions and chat submissions from a plurality of users; present the virtual world through the GUI 110 in accordance with the location information; receive selections from users that change aspects of the character and/or virtual world; update the virtual world for users in accordance with the received changes; and/or other operations.

The user profiles 118 can include one or more entries or data structures that include or otherwise identify one or more aspects of a user. For example, the user profile 118 may identify a character, information associated with the appearance of that character, collected cards and virtual items, a status, and/or other information associated with the avatar. In some implementations, the user profile 118 may include information identifying attributes of a character, information associated with a character's collected cards and virtual items, and values of character parameters that may change over time. In regards to character attributes, the user profile 118 may include or identify a type of character, a character name, login and security information and settings, gender information, attributes and character data such as health, mana, school of magical focus, virtual items owned or otherwise associated with the character, physical aspects (e.g., hair style, hair color, eye color), clothing, pets, weapons, jewelry, spells learned or collected, items collected, quests completed or currently underway, friend information, information about the virtual real estate properties they own and the ownership and placement of any furniture associated with said properties, win and loss ratings for player duels, badges earned and display preferences. In regards to collected cards, the user profile 118 may also include or otherwise identify playing cards in the character's possession, cards selected for the character's combat deck, spell name (e.g. firecat), spell type (e.g., fire, balance), effect type (e.g., damage, healing charms), spell accuracy (e.g., hit probability), pip cost, damage or healing amount, text and iconic description (e.g. "150 points of fire damage to target"), and/or any other aspects of the cards collected by players. As for character parameters, the user profile 118 may identify current values of character parameters such as health level, power level, experience level, health level, chat level, and/or other aspects of the user that may vary with time. In some implementations, the user profile 118 may include a duel history, a win/loss count, a quest history, school, and/or other information associated with the user.

The 3D rules 120 can include any parameters, variables, policies, algorithms, instructions, settings, and/or rules for presenting elements representing user information through the GUI 110. For example, the 3D rules 120 may define a layout and/or design characteristics for displaying elements representing charms and/or wards using a hanging effect. A hanging effect may include graphical elements floating in a radius proximate a player, whether a particular player or other target, on which the hanging effect has been applied. For example, the hanging effect can be one or more 3D objects that represent spell effects triggered by other incoming or outgoing spells. In other words, the 3D objects can be dynamically created and destroyed based on combat actions. In some implementations, the 3D rules 120 may define layout and/or design characteristics for presenting elements, as well as transformation rules for dynamically modifying the attributes of the elements (e.g., size, color, symbol, shape) based, at least in part, on one or more events. For example, the 3D rules 120 may define orientation rules, placement rules, color rules, scaling rules, image transformation rules (e.g., scaling rules, cropping rules), and/or other settings for presenting 3D elements representing user information. Of course, the above parameters and rules are for example purposes, and the 3D rules 120 may include some, none, or different rules for presenting user elements without departing from the scope of this disclosure. For example, the 3D rules 120 may identify a rule indicating an expression for updating a rotational speed of an element in response to an event such as a decrease in user's health.

In some implementations, the 3D rules 120 may include directives for presenting both character aspects and environmental aspects during combat. For example, the combat aspects may include one or more of the following: turn order of players as shown by the relative location of the players and monsters around duel circle, current turn marker as shown by the turn marker; hanging effects applied to any participants (e.g. charms, curses, wards and traps); pips and power pips; health; name; title or selected badge, chat level information, damage/heal amount; resist/buff activation; fizzle; target marker; focus effect; global effect; and/or others. The player ring may be a ring where combatants stand during duels. Each ring may have a unique color and a corresponding iconic symbol, and the color and symbol may be used to identify casters and targets in this duel without requiring the players to refer to them by name. Charms and curses may be represented by small 3D objects that float in a circular pattern at a set radius around a player's head. Wards and traps may be represented by small 3D objects that float in a circular pattern at a set radius around a player's waist. Damage-over-time and Healing-over-time spells may be represented by small 3D objects that float in a circular pattern at a ser radius around the player's feet. Pips may be represented by small yellow dots along the front inside arc of the player ring. If the pip is a power pip, the yellow dot may be glowing brighter and/or a different color (e.g., white with a slight blue tint). Health may be represented by glowing runes along the inner colored circle of the player ring. As a player is damaged, the runes may start to black out or disappear. The player's name may be presented above their head. In response to a player getting hit with a spell, the amount and type of damage (or healing) deducted from or added to the player may be presented above their head. When player is hit with a spell (or casts a spell) and has a resistance, buff, or debuff, an iconic representation may be presented above their head. In casting spells, text identifying the spell may be shown prior to presenting a casting sequence. For spells targeting a player, text identifying the spell may be displayed prior to presenting the damage to the target. When a spell misses a target, the word "fizzle" may be presented above the intended target's head. During the planning phase, turn marker may indicate the first caster. Whenever a caster targets another combatant, a blinking indicator may light up around the target participant's ring to indicate the targeted player or monster. In some examples, the element may be a particle effect on the ground and incorporated into the dueling circle. During the execution phase, a turn marker may indicate a combatant's turn. In some examples, the element may be a particle effect on the ground or a rotating 3D element incorporated into the dueling circle. When a combatant chooses to Pass, a particle effect may be presented that goes off around him originating from the participant ring on his turn during the focus stage. Whenever a global spell is cast, a particle effect may be presented as a globe encompassing the dueling circle. In some case, the effect may be presented as the type of spell (e.g., fire, ice).

In addition, the 3D rules 120 may include directives for cinematic aspects based, at least in part, on different stages and/or player actions. For example, the 3D rules 120 may identify different camera movements and cinematic approaches for each step or stage in a duel such as a predetermined angle and distance from a combat circle. For example, the camera may move along predetermined tracks, which, for a given stage, may include multiple random predetermined tracks for random selection. In addition, the random tracks may be different for different teams. In some implementations, the 3D rules 120 may identify directives for one or more of the following steps: starting, focus, casting, outgoing, global, summon, bounce, incoming, object act, hit/miss, death, and/or others. In regards to the starting step, the 3D rules 120 may require highlighting the circle the player is on, selecting a pre-defined camera move or angle, presenting sound effect for indicating that a player is being indicated as the current potential caster. As for passing, the 3D rules 120 may be substantially similar to the starting step settings. For casting, the 3D rules 120 may indicate that an artist-created animation and special effects particle sequence (e.g., glows, fairy dust, fire effect, lighting effects, wind or ice effects, star bursts) is played on the casting player or monster with a custom camera move or angle. Animations may be determined by the model of the character and/or the discipline of magic being cast. For outgoing, the 3D rules 120 may require display of an effect that may persist beyond this round of combat (e.g., a shield). These directives may include playing a custom animation sequence with a custom camera move and/or angle and creation and animation of a 3D object or creature. As for hanging effects and globals, the 3D rules 120 may direct that an effect be created and applied to one or more team members, or the 3D environment. In addition, the camera move and/or angle may be fixed so that it may present a certain view for various situations. As for summons, the 3D rules 120 may include instructions to play with a pre-defined camera move and/or angle. As for bounce, the 3D rules 120 may identify a pre-defined camera move and/or angle and include instructions that the rotation of the summoned object spin on the vertical access to face the new target. As for incoming, the 3D rules 120 may include instructions to present a cut-scene with a pre-defined camera move and/or angle. As for object act, the 3D rules 120 may include instructions to present a cut-scene with a pre-defined camera move and/or angle. As for hit/miss, the 3D rules 120 may include instructions to present a cut-scene at a custom camera angle. As for death, the 3D rules 120 may include instructions to present a cut-scene with custom camera angle and the defeated player or monster may persist after the cut-scene.

The quest module 122 can include software for assisting or otherwise aiding character movements through the virtual world. For example, the quest module 122 may present directions to a destination associated with performing a task in a quest. In some implementations, the quest module 122 may aide in the following: (1) quests the characters participate in; and (2) navigation between two points in the virtual world. For example, the quest module 122 may present a list of tasks associated with a quest and a character's progress. As for navigation examples, the quest module 122 may present user locations (e.g., point on maps) and directions to destinations selected by the user. The quest module 122 may display a compass indicating directions the user should take to reach a destination. In some implementations, the quest module 122 may include instructions for one or more of the following: presenting information associated with quests such as tasks and progress; locating characters on a map of the virtual world; determining a course between two places in the virtual world; presenting directions to a user based on a destination; and/or other aspects associated with navigating in the virtual world. In regards to locating a position on a map, the quest module 122 may present a map of the virtual world and indicate a character's location by, for example, overlaying a graphical element (e.g., dot, figure). The map may include structures, characters, quests, and/or other elements in the virtual world. As for navigating to a destination, the quest module 122 may present a 3D arrow through the GUI 110 indicating directions for a player. In some implementations, the 3D arrow may be presented independent of the virtual world or without presenting the arrow in the virtual world. The 3D element may rotate about a single axis. In some cases, the 3D element may not be updated based on height differences between the player and the destination. In some implementations, the direction may be based on a current goal in a quest and using a navigation map. The navigation map may identify each zone and include a graph of nodes that connect different locations in the virtual world. In some implementations, the graph may be a network that can be traversed by characters including teleporters to different zones. In these implementations, the nodes may be dispersed to make path determinations sufficiently simple but dense enough to handle crossing bridges and other fine details of the map. In some implementations, the quest module 122 may indicate directions to the closest goal in the event the quest includes a plurality of different goals. For example, the quest module 122 may determine a path to each goal with the least amount of travel time based on one or more algorithms. In some examples, a simple A* path finding algorithm may be evaluated to find the shortest path from one node or place to another. In these examples, the paths may be chained together across zone boundaries if the destination lies outside the current zone. While illustrated in the server 102, the quest module 122 or one or more processes in the quest module 122 may be executed in the client 104, which means any information such as the zone names of the teleporters may be located within a map data file stored in the client 104. Each path generated may include a distance-traveled value for comparison to other paths. A teleport may be assigned a specific amount of travel distance (e.g., a few hundred meters). In connection with determining a path to a destination, the quest module 122 may include instructions for changing the orientation of, for example, a compass presented to a user as the path changes. For example, the quest module 122 may include instructions for presenting an arrow right when the determined path turns right. In these implementations, the quest module 122 may include instructions for presenting turn-by-turn directions to a user in the virtual world using one or more graphical elements. In addition to a list of goals, the quest module 122 may present a brief textual summary of each goal and the player's amount of progress towards completion of that goal (e.g., Defeat Ghosts (2 out of 5)). For example, the goal list may include one or more of the following: waypoint goals that may use the center of a volume they refer to; bounty goals that may look up monster(s) to kill and find their paths/spawn points and find a "center" position to point to; personal goals that may use the location players are directed to find; and/or other goals.

The combat rules 124 can include any parameters, variables, algorithms, instructions, rules, objects or other directives for evaluating actions between users during combat, such as magical dueling. For example, the combat rules 124 may determine an effect of a user (e.g., damage) based, at least in part, on the actions (e.g., spells) selected by an opponent. In some implementations, the combat rules 124 can implement mathematical and/or logical expressions for determining values for one or more parameters associated with a user or his character. For example, the combat rules 124 can facilitate determining a status value (e.g., health level) based on one or more variables associated with, for example, the environment, the initial status, actions played, and/or other aspects of combat. In some implementations, the combat rules 124 can include one or more of the following variables: #oP=current number of pips; PHealth=current player health; MHealth=current mob health; MMaxHealth=mob's max health; Damage=spell's damage amount; heal=spell's heal amount; and accuracy=spell's accuracy. In this implementation, the combat rules 124 may include mathematical and/or logical expressions based on these variables. In some examples, the combat rules 124 may identify an expression for determining a Damage Per Pip of a card such as, for example, the expression below:

$$Damage=Pips*400$$

In this example, this calculation may apply to offensive cards (e.g., damage, traps). In the case of an offensive spell that has no damage (e.g., Fire Trap), the Damage Per Pip may be a fixed number (e.g., 81). In some examples, the combat rules 124 may identify a PipMod (Pip Modifier) or a cost of a spell versus how many Pips the player currently is using, for example, the expression below:

$$IF\ (\#oP/Rank<=1)\ THEN\ (PipMod=\#oP/Rank)\ ELSE\ (PipMod=Rank/Rank)$$

In some examples, the combat rules 124 may identify an expression for an EValue (Effect Value) using, for example, the expression below:

$$EValue=(EValue=1/(E\#+1))$$

In some examples, the combat rules 124 may identify an expression for HRatio (Health Ratio) or a ratio of a Mob's current health versus their total health using, for example, the following:

$$HRatio=Mhealth/MmaxHealth$$

In some examples, the combat rules 124 may identify an expression for AggModMod (Aggressive Modifier Modifier). In some cases, the AggModMod gets smaller when the Mob takes damage, as indicated by the following curve:

$$IF\ (((3.39*(1-HRatio)^2)-(6.0893*(1-HRatio))+2.75)>=1)\ THEN\ (AggModMod=1)\ ELSE\ (AggModMod=(3.39*(1-HRatio)^2)-(6.0893*(1-HRatio))+2.75)$$

In some examples, the combat rules 124 may identify an expression for AggMod (Aggressive Modifier)/DefMod (Defensive Modifier) that may be used as a multiplier for aggressive spells. In some cases, the Defensive Modifier may be 10 minus the Aggressive Modifier such that Aggressive Modifer plus Defensive Modifier equals 10. In addition, the Aggressive Modifier may be between 1 and 9 and neither the Aggressive Modifier nor the Defensive Modifier may be less than 1. In these examples, the combat rules 124 may identify the following expressions:

$$AggMod=BaseAggMod*AggModMod$$

$$DefMod=10-AggMod$$

In some examples, the combat rules 124 may identify an expression for AggValue (Aggressive Value) that may be a modified version of DPP in light of a current number of Pips. The expression may also prevent a spell's value from climbing once the player has more pips than the spell needs. In these examples, the combat rules 124 may identify the following expression:

$$IF\ (\#oP<Rank)\ THEN\ (AggValue=DPP*\#oP)\ ELSE\ (AggValue=DPP*Rank)$$

For heals and shields, this expression may equal zero. In some examples, the combat rules 124 may identify an expression for DefValue (Defensive Value) that may be a version of DPP for defensive spells. In some cases, the combat rules 124 may identify different expressions for shields and healing spells such as, for example the following:

$$DefValue=a\ specified\ number\ for\ shields;\ and$$

$$DefValue=(Heal/Rank)*Accuracy\ for\ healing\ spells$$

In some examples, the combat rules 124 may identify an expression for KFactor (Kill Factor) that may increase the score of a card if it can kill a target. In some instances, this expression may take into account accuracy. For example, a 90% kill card may be more valuable than a 60% kill card. The combat rules 124 may identify the following expression:

$$IF\ ((Damage>=PHealth)\ AND\ (\#oP>=Rank))\ THEN\ ((KFactor=1+Accuracy)\ ELSE\ (KFactor=1))$$

The combat rules 124 may restrict the lowest value of the KFactor to one. This expression may ensure that a spell will kill a target and that a mob has enough pips to cast the spell. If the expression is satisfied, the accuracy may be added. In some examples, the combat rules 124 may identify an expression for Overkill that determines if a spell does more damage than the target has health. The combat rules 124 may include the following expression for overkill:

$$IF\ ((Damage<=0)\ OR\ (Damage>PHealth))\ THEN\ (Overkill=1)\ ELSE\ (Overkill=1+Accuracy)$$

In some examples, the combat rules 124 may identify an expression for HEfficiency (Heal Efficiency) that determines an efficiency of a heal spell such that mobs don't violate a threshold. The combat rules 124 may identify the following expression for HEfficiency:

$$HEfficiency=(MMaxHealth-(AbsoluteValue(MMaxHealth-(Heal+MHealth))))/MMaxHealth$$

The AbsoluteValue portion of the expression may generate a number that represents how far away from full health the mob will be after healing. In some examples, the combat rules 124 may identify an expression for HFactor (Heal Factor) that may be included in a FinalDefValue calculation. The combat rules 124 may identify the following expression for HFactor:

$$HFactor=DefValue*HEfficiency*PipMod$$

The above expressions are for illustration purposes only and the combat rules 124 may include some, none, or all of the expressions without departing from the scope of this disclosure.

In addition, the combat rules 124 may include instructions to present text to a user in response to one or more combat events. For example, the combat rules 124 may include a round announcement indicating a round in a duel. The format may be "Round X" and the text may appear in the middle of the screen in large, colorful, exciting letters. The combat rules 124 may include instructions to indicate a pip gain. For example, when the player receives a regular Pip, the words "Pip Up!" may appear on the screen in nice, big, colorful letters. If the player receives a Power Pip, the words "Power Pip!" may appear on the screen in large, colorful, exciting letters. In some implementations, the combat rules 124 may include instructions to indicate end of combat. For example, the words "Victory!" or "Defeat" may appear. If the players win the combat, then the words "Victory!" may appear in large, colorful letters during the victory phase. If they lose, the words "Defeat" may appear in large, sad letters.

The chat rules 126 can include any parameters, variables, algorithms, instructions, rules, objects or other directives for entering and presenting dialogue between players through GUI 110. For example, the chat rules 126 may include instructions for filtering dialogue between players based on, for example, a difference in chat levels. In some implementations, the chat rules 126 may include directives for one or more of the following: determining levels of players participating in a dialogue; representing the chat levels of players in the 3D environment; identifying rules for filtering dialogue based on player levels; modifying dialogue between players in accordance with the rules; displaying a user's chat level using, for example, an icon; and/or other rules. In some implementations, the chat rules 126 may include a list of pre-defined phrases that a user may select to present to another player. Additional phrases may be purchased, acquired through quests, and/or otherwise added to the list. In some implementations, the chat rules 126 may include directives associated with one or more of the following: restricting chat messages to an area of influence; sending pages to players on the same and/or different servers; providing a mechanism for players to subscribe and/or unsubscribe players; providing dialogue channels that are zone-wide only and other channels that cross all zones; and/or complying with the COPPA laws (see http://www.coppa.org/) such as logging and archiving dialogue. The chat rules 126 may include different permissions based on a user's status. For example, the chat rules 126 may include permissions such as an easy chat, a secure chat, an open chat, and/or others.

The chat rules 126 may identify directives for easy chat that present a plurality of selectable actions and/or phrases for a user. For example, the instructions may include a list that may be opened by clicking on an icon in the upper right hand corner of the GUI 110. In some implementations, the chat rules 126 be may instructions for presenting selected chat to players within a specified range (e.g., 30 meters). The range at which these bubbles are presented may be adjustable. In some cases, the chat rules 126 include instructions for switching between a chat bubble and/or a window in the GUI 110. The distance between when the chat bubble appears on top of a user's head, and the distance to when the dialogue appears on the side of the screen may vary between users. For example, the range at which chat bubbles appear above the head may start at 30 meters. If the speaker is out of view, the chat rules 126 may include instructions for presenting the dialogue on the side of the GUI 110 that is closest to the speaker, but kept within the boundaries of the player's screen such that the text is fully readable, and may be prefaced by the speaker's name. In some implementations, the chat rules 126 may prevent or remove presentation of a dialogue box when an off-screen speaker is outside a specified range (e.g., 20 meters). In addition, the chat rules 126 may identify a plurality of different chat boxes and directives for presenting dialogue in the different boxes based on one or more parameters. For example, the chat rules 126 may identify 10 predetermined slots that are each fixed in size. The parameters for presenting the dialogue in different boxes may include, for example, proximity, friend, chat level, player age, and/or others. In addition, the chat rules 126 may include instructions for presenting dialogue such as font, text, color, bubble tint, orientation and/or other aspects for presenting dialogue in a 3D environment. For example, the chat rules 126 may include instructions for presenting dialogue in a white comic book style bubble with black text and rotating the dialogue to face each player. In some implementations, the chat rules 126 include instructions for scaling dialogue based, at least in part, on a distance between players. For example, the size of the chat bubble may scale down linearly to 20% at 30 meters and then disappear at greater distances. In some implementations, the chat rules 126 may specify a period of time for presenting dialogue. For example, chat bubbles and/or the accompanying off-screen chat boxes may stay on the screen for 4 seconds. In some implementations, the chat rules 126 may include instructions for deleting or at least modifying other graphical elements associated with the player presenting dialogue. For example, the presented dialogue may replace a name billboard when a player presents dialogue.

In addition, the chat rules 126 may include instructions based on different types of dialogue. For example, the chat rules 126 may identify a plurality of different selectable dialogue types and rules for presenting dialogue based on the selected type. The chat rules 126 may identify "Text" as a dialogue type and present the entered dialogue to a single player. In addition, the chat rules 126 may include instructions for presenting elements different from text such as, for example, socials and/or emotes. For example, emotes may include animations applied to a player's character and may include sound effects. In some implementations, the chat rules 126 may include instructions to automatically present an emote if a text option is selected. For example, an emote may be a social animation and/or an associated text phrase describing the action being performed, such as "Susan waves to you." or "Timmy takes a bow." Some emotes may not be associated with text. In some implementations, the chat rules 126 may include instructions to add actions to, for example, a character. For instance, the chat rules 126 may include instructions for adding facial expressions (e.g., increasing eye size, turning mouth to a smile) in response to, for example, a selected phrase. The chat rules 126 may include instructions for one or more of the following: eye animation; mouth animation; character animation; character animation; sound effect; and/or others.

In regards to open chat, the chat rules 126 may filter dialogue exchanged through open chat using, for example, dictionaries of acceptable words and unacceptable phrases. In some examples, the chat rules 126 may include a white list that identifies acceptable words for use in filtered chat. In these cases, the chat rules 126 may include instructions for presenting words colored RED as they are being typed into the interface unless that word is identified in the white list. For example, the letters in the word belligerent may change colors during typing as described below: (1) bel . . . (at this point, the letters are red); (2) bell . . . (at this point, the letters are white because the word "bell" is valid); (3) belli . . . (at this point, the letters turn red); and (4) belligerent . . . (at this point, the letters turn white while white). In some cases, the words in red may be replaced by a character string such as "#$%!." when this dialogue is displayed to other players of filtered chat or lower chat level. In some case, the chat rules 126 may include a Black List that identifies phrases that are prohibited and include instructions for presenting the letters in, for example, red. For example, the letters in the phrase "look under my robe" may change color during typing as follows: (1) Look (would be white); (2) Look under (would be white); (3) Look under my (would be white); and Look under my robe (at least the phrase "under my robe" would be red). The chat rules 126 may include instructions to compare entered text to one or more lists in response to a last user action (e.g., spacebar hit). In some implementations, the chat rules 126 may include directives associated with one or more of the following: predicting text to help with spelling issues; securing chat level based on a parent password; and/or other features. The chat rules 126 may include instructions to open a text entry box in response to a user action (e.g., pressing enter). The chat rules 126 may include instructions for presenting text based on the number of characters entered. For example, if the character number exceeds a character limit (e.g., 54), the chat rules 126 may include instructions to remove the text from the chat box and automatically display the text in a normal billboard style chat bubble. In addition, the chat rules 126 may include instructions for presenting text to nearby players, only to a single player (e.g., selected from the GUI 110 or from the Friends); and/or others. In some implementations, the chat rules 126 may include instructions for using different background colors and shapes for chat bubbles based on the type of communication. For example, the chat rules 126 may include instructions for chat bubbles as follows: Open Chat—different color background than Easy Chat; Easy Chat—different color background than Open Chat; Open Tell—Same color as Open Chat, different shaped chat bubble; and Easy Tell—Same color as Easy Chat, different shaped chat bubble. In some implementations, the chat rules 126 may prevent texts entered from a player using open chat from being presented to a player using easy chat. Though, the chat rules 126 may include instructions for indicating an attempt to communicate such as a sound effect and/or a nonsensical character string in the dialogue box. The chat rules 126 may include instructions for limiting access to open chat based on age, parental consent, and/or other factors.

Processor 114 executes instructions and manipulates data to perform operations of the server 102. Although FIG. 1 illustrates a single processor 114 in the server 102, multiple processors 114 may be used according to particular needs, and reference to processor 114 is meant to include multiple processors 114 where applicable. In the illustrated implementation, the processor 114 executes various software such as the illustrated presentation engine 128, combat engine 130 and chat engine 132 at any appropriate time such as, for example, in response to a request or input from a user of the client 104 or any appropriate computer system coupled with network 106. Indeed, the software may be written or described in any appropriate computer language including C, C++, Java, Visual Basic, assembler, Perl, any suitable version of graphics software or APIs, as well as others. It will be understood that the software may include any number of sub-modules, such as the illustrated engines and third party modules or libraries, or it may instead be a single multi-tasked module that implements the various features and functionality through various objects, methods, or other processes. Regardless of the particular implementation, "software" or "computer readable instructions" may include any software, firmware, wired or programmed hardware, or any combination thereof (embodied on or in tangible computer readable media) as appropriate to, when executed, instruct the respective one or more processors.

The presentation engine 128 can include any software operable to present data associated with a character. For example, the presentation engine 128 may present 3D objects (e.g., floating 3D objects) that indicate one or more aspects of the character (e.g., charms, curses, wards and traps) and dynamically update the presentation based, at least in part, on one or more aspects of, for example, a duel. In some implementations, the presentation engine 128 may execute one or more of the following: identify one or more attributes of a wizard in a user profile 118; generate a player avatar or character based, at least in part, on the identified attributes; receive a request from the user to view one or more graphical elements (e.g., items) from a user; identify one or more aspects of the requested element in the user profile 118; generate a presentation of the graphical element to display through the GUI 110; identify one or more characters in a duel and associated actions selected from the users; dynamically present and/or update presentation of graphical elements in response to user actions; identify 3D rules 120 associated with a player's context; present graphical elements to the user in accordance with the 3D rules; and/or other presentation process with players interacting in a virtual world.

The combat engine 130 can include any software operable to evaluate actions executed by players in a duel. For example, the combat engine 130 may determine how much damage resulted from a spell based, at least in part, on parameters such as the played card, the environment, and/or other parameters. In some implementations, the combat engine 130 may execute one or more of the following: identify a player selection and associated character attributes based, at least in part, on the corresponding user profiles 118; group multiple players in teams in accordance with one or more user selections; identify combat rules 124 based, at least in part, on a format associated with the duel (e.g., player versus player, team versus team); identify the turns for each player in a duel; notify a player when their turn is identified; advance the turn to the next player when the previous player either selects an action or times out; identify cards selected by the users in the duels and associated aspects of the spell associated with that card (e.g., type, damage, cost); the target of any selected card, if any; identify one or more equations associated with the played card using the combat rules 124; determine results of played cards based, at least in part, on the identified equations and variables associated with the combat; and/or update user profiles 118 in accordance with the determined results. In some implementations, duels may be various combinations of players such as, for example, player versus player, players versus monsters, player and friendly monsters versus players and friendly monsters, and player and friendly monsters versus monsters. For example, the duels may include 2 to 8 players and/or monsters and/or friendly monsters. Based on the format of the duel, the combat engine 130 may identify one or more combat rules 124 associated with the format. In some cases, the duel may be between players and characters generated by the game application 116 such as monsters. During combat, the combat engine 130 may receive a selection from a user that identifies a card from a plurality of selectable cards in a user's deck and identify one or more expressions from the combat rules 124 associated with the played card. As described above, the combat engine 130 may select an expression for determining an amount of damage to a player resulting from a played card. In connection with solving identified expressions, the combat engine 130 may determine values for one or more parameters included in the identified expression. The combat engine 130 may determine values from user profiles 118, values from the virtual environment, and/or other aspects of the virtual world. In addition, the combat engine 130 may initiate an update of the virtual world such as presenting visual and/or sound effects, updating graphical elements associated with players, and/or other effects experienced by the user.

The chat engine 132 can include any software operable to manage dialogue between players. For example, the chat engine 132 may filter dialogue between players based, at least in part, on players' chat levels and/or dialogue content. In some implementations, the chat engine 132 may execute one or more of the following: receive requests to present dialogue to one or more users from the clients 104; identify one or more rules associated with the players using the chat rules 126; determine one or more parameters associated with the users (e.g., distance, chat level) using, for example, the user profiles 118; determine whether the text matches one or more lists (e.g., white list, black list) included in the chat rules 126; present the text to the users in accordance with the rules and the one or more parameters; dynamically update the text based, at least in part, on additional text entered by the users; and/or other processes. In some implementations, the chat engine 132 may receive a request identifying dialogue (e.g., selected, user entered) and a dialogue type such as player to player (e.g., whisper, secured chat). In connection with the request, the chat engine 132 may identify a chat level associated with the requesting player based, at least in part, on the user profile 118. For example, the chat engine 132 may determine a player has an open chat level or an easy chat level. In regards to filtered chat, the chat engine 132 may compare entered text to one or more lists of prohibited and/or acceptable text. In response to at least a match, the chat engine 132 may dynamically update the text in accordance with the rules such as replacing text with a string of characters or updating the color of the letters. In some implementations, the chat engine 132 may present the dialogue based on parameters associated with the environment. For example, the chat engine 132 may switch between presenting the dialogue in a bubble or chat box based on proximity of characters and/or display preferences of the player. In the case that the game application 116 presents multiple dialogue boxes, the chat engine 132 may switch the text between a plurality of different boxes based on, for example, length of text, time entered, and/or other parameters.

Clients 104a-c are any devices (e.g., computing devices) operable to connect or communicate with the server 102 or network 106 using any communication link. Each client 104 includes, executes, or otherwise presents a Graphical User Interface (GUI) 110 and comprises an electronic device operable to receive, transmit, process and store any appropriate data associated with system 100. While the illustrated implementation includes example clients 104a-c, system 100 may include any number of clients 104 communicably coupled to the server 102. Further, "client 104," "user," "player," and "character" may be used interchangeably, as appropriate. Moreover, for ease of illustration, each client 104 is described in terms of being used by one user. But many users may use one device or one user may use multiple devices.

As used in this disclosure, a user of client 104 is any person, group, organization, a process implemented in software or hardware, or any other entity that may use or request others to use system 100. Client 104 is intended to encompass a personal computer, touch screen terminal, workstation, network computer, kiosk, wireless data port, smart phone, personal data assistant (PDA), one or more processors within these or other devices, or any other suitable processing or electronic device used by a user viewing content from the server 102. For example, the client 104 may be a PDA operable to wirelessly connect with an external or unsecured network. In another example, the client 104 may comprise a laptop that includes an input device, such as a keypad, touch screen, mouse, or other device that can accept information, and an output device that conveys information associated with questions and answers posted using the server 102, including digital data, visual information, or GUI 110. Both the input device and output device may include fixed or removable storage media such as a magnetic computer disk, CD-ROM, or other suitable media to both receive input from and provide output to users of clients 104 through the display, namely the client portion of GUI 110.

The GUI 110 comprises a graphical user interface operable to allow the user of the client 104 to interface with at least a portion of system 100 for any suitable purpose, such as viewing a virtual world in real time. Generally, the GUI 110 provides the particular user with an efficient and user-friendly presentation of data provided by or communicated within system 100. The GUI 110 may comprise a plurality of customizable frames or views having interactive fields, pull-down lists, and buttons operated by the user. The GUI 110 can be configurable, supporting a combination of graphical elements, to present the Web pages 118 including the graphical elements 128. The term graphical user interface may be used in the singular or in the plural to describe one or more graphical user interfaces and each of the displays of a particular graphical user interface. The GUI 110 may be any graphical user interface, such as a generic web browser or touch screen, that processes information in the system 100 and efficiently presents the results to the user. The server 102 can accept data from the client 104 via a client application or web browser (e.g., Microsoft Internet Explorer or Netscape Navigator) and return the appropriate HTML, XML, and/or other responses to the browser using the network 106, such as the graphical elements 128.

The graphical elements 128 may include any graphical elements that present 3D elements to the user of the client 104. For example, the graphical elements 128 may represent spells in connection with a user selecting a card to play. In some implementations, the graphical elements 128 may be interactive elements such that a selection executes one or more processes (e.g., casting a spell). The graphical elements 128 may include one or more of the following: text, color, sound, buttons, fields, and/or any other suitable electronic element. For example, the graphical elements 128 may be a question mark floating over a character's head that presents information to a player in response to a selection.

As previously mentioned, the client 104 may execute one or more processes illustrated as executed by server 102. In some implementations, the client 104 may include a client-side module 134 that processes information associated with the game application 116. For example, the server 102 may transmit messages 136 to the client 104, and the client 104 may transmit messages 138 to the server 102. The server 102 may transmit a message 136 to the client-side module 134b indicating a duel has begun. In addition, the server 102 may transmit information indicating a player's hand at the beginning of the planning phase. In response to at least a user selecting one or more graphical elements 128, the client module 134b may transmit information identifying one or more cards selected by the user for the current round. The server 102 may transmit a message 134b indicating actions selected by combatants in the duel. Using the included information, the client-side module 134b may resolve the combat based, at least in part, on the selected actions and present a 3D sequence illustrating the results. In some implementations, the client-side module 134b may execute one or more processes associated with the combat engine 130, such as determining the results of a duel, and one or more process of the presentation engine 128 for presenting 3D elements 128 illustrating the effect of the duel. The server 102 may transmit messages to the client-side module 134 indicating one or more of the following: duel ended; a new phase of combat (Planning, Execution, Resolution, and Ended); new player has joined duel; player left duel; a teammates selected action; enchant an identified card; pips of players at the start of the duel; and/or other information.

Network 106 facilitates wireless or wireline communication between the server 102 and any other local or remote computer, such as clients 104. Network 106 may be all or a portion of an enterprise or secured network. While illustrated as single network, the network 106 may be a continuous network logically divided into various sub-nets or virtual networks, so long as at least portion of the network 106 may facilitate communications of answers and references between the server 102 and at least one client 104. In some implementations, the network 106 encompasses any internal or external network, networks, sub-network, or combination thereof operable to facilitate communications between various computing components in the system 100. The network 106 may communicate, for example, Internet Protocol (IP) packets, Frame Relay frames, Asynchronous Transfer Mode (ATM) cells, voice, video, data, and other suitable information between network addresses. The network 106 may include one or more local area networks (LANs), radio access networks (RANs), metropolitan area networks (MANs), wide area networks (WANs), all or a portion of the global computer network known as the Internet, and/or any other communication system or systems at one or more locations.

FIGS. 2A-2F is a flowchart illustrating an example method 200 for executing a duel between users in accordance with some implementations of the present disclosure. At a high level, the method includes the following twelve stages: (1) planning phase; (2) starting stage; (3) focus stage; (4) target stage; (5) outgoing stage; (6) casting stage; (7) global stage; (8) summon stage; (9) bounce stage; (10) incoming stage; (11) object act stage; and (12) release stage. Examples of the method 200 may be described in terms of the computer system 100. But it should be understood that any other suitably configured computer system or environment may also be used to perform, request, execute, or otherwise implement the method 200. In other words, method 200 may use any appropriate combination and arrangement of logical elements implementing some or all of the described functionality.

Turning to the illustrated process, method 200 begins at the planning stage indicated by step 202. For example, the game application 116 may present the teams of players in, for example, an arena and users of the client 104 may select cards through the GUI 110 to include in their dueling deck. In addition, the users may select specific cards for the identified round. For example, a user may select a shield spell through GUI 110. Next, at the starting stage, a marker is presented to the duelers indicating the player to act at step 204. In the example, the game application 116 may present a graphical element 128 that highlights or otherwise indicates a player's turn. If the player selects to pass this turn at decisional step 206, then execution moves to step 208 where the player's action is omitted at this round. In the example, the game application 116 may determine that the acting player may have omitted actions this round enabling, for example, the player to determine a strategy for next round. If another caster in the same team is available at decisional step 210, then execution returns to step 204. If another caster is not available in the team, then execution returns to step 202. Returning to decisional step 206, execution proceeds to decisional step 212 if the player is not focusing. If the selected target is not alive at decisional step 212, then execution proceeds to step 208 where a player's new target is identified. If the selected target is still alive, at step 214, a target designator is applied to the target such as a target marker.

If a player initiated a caster outgoing spell effect at decisional step 216, then at step 218, a hanging effect is applied to the target. Returning to the example, the game application 116 may present a 3D element overlaying the target and indicating an attack such as a flame. If the spell is absorbed by the target at decisional step 220, then execution proceeds to decisional step 222. If another caster is included in the team, then execution returns to step 204. As for the example, the game application 116 may select a next player in the team in connection with determining a target. If another caster is not available in the team, then execution returns to step 202. Returning to decisional step 216, if the player does not select an outgoing spell effect, then execution proceeds to decisional step 224. If the player selects a spell to target an incoming spell effect, then at step 226, a hanging effect is applied to the player. As for the example, the game application 116 may overlay a 3D element on the player to indicate the incoming spell. If the spell is absorbed at decisional step 228, then execution proceeds to decisional step 222. If the spell is not absorbed, then execution returns to decisional step 224.

If the spell selected does not target the incoming spell effect, then execution proceeds to decisional step 230. If a target is hit by the selected spell, then at step 223, then a hit animation sequence presented to the user. For example, the game application 116 may present an animated sequence to the users indicating the spell affected the target. If a global active is identified at decisional step 234, then at step 236, a current global effect is applied. Again in the example, the combat engine 130 may identify a global effect using the combat rules 124 and applied the global event to the duel circle presented through the GUI 110. If a global active is not identified, then at step 238, then a summon object is presented to the users. If the spell is a global at decisional step 240, then at step 242, the current global effect is replaced. Execution then returns to 204. Returning to decisional step 240, if the spell selected is not a global, then execution proceeds to decisional step 244.

If the spell is a caster damage type effect, then at step 246, a hanging effect is applied to the caster. Execution then returns to decisional step 244. If the spell is not a caster damage type effect at decisional step 244, then execution proceeds to decisional step 248. If the spell is a target damage type effect, then at step 250, then the spell attempts to trigger a hanging effect, if an appropriate defensive hanging effect is already on the target. The damage also results in an object act being presented. If a new target is selected at decisional step 252, then at step 254, a target designator is identified. If a new target is not selected, then execution returns to decisional step 248. If the spell is not a target damage type effect, then at step 256, an object act is presented. For example, the combat engine 130 may present an animation of a figure representing a spell. At steps 258 and 260, a hit sequence and any resistance information are presented to the users. For example, the combat engine 130 may animate a target illustrating an effect and any resistance the target initiates. Next, at step 262, health is adjusted or another effect on the player is applied. Again in the example, the combat engine 130 may determine values for one or more parameters associated with the target based, at least in part, on expressions in the combat rules 124 and user variables in the user files 118. If another action is selected at decisional step 264, then execution proceeds to step 254 where a target designator is identified. If another action is not selected, then execution proceeds to decisional step 266. If the release stage is identified at step 266, then the summoned object is released at step 268. If the release stage is not identified, then execution proceeds to decisional step 270. If the target dies, then the target death is presented to the users at step 272. If the target does not die, then execution proceeds to decisional step 274. If more targets are identified, then execution proceeds to step 254 where a new target designator is identified. If no additional targets are identified, then execution proceeds to decisional step 276. Returning to decisional step 230, if the target is missed, then a casting sequence miss is presented to the users at step 278. Execution then proceeds to decisional step 276. If another caster is available, then execution proceeds to step 254 where a target designator is identified. If another caster is not available, then execution proceeds to decisional step 280. If the duel has ended, then an ending sequence is presented to the users at step 282. If the duel has not ended, then execution returns to step 202.

FIGS. 3A-G is a schematic chart 300 illustrating different channels associated with a duel. In this example, the chart 300 includes a music channel 302, a caster channel 304, a target channel 306, an object channel 308, a general channel 310 and a camera channel 312. The channels 302-312 illustrate different categories and processes that may occur in each category and relative timing between the different channels. For example, the music channel 302 indicates that music may be presented to the users at different stages in the duel such as the planning stage, the combat stage, the death and the victory/defeat stage. The caster channel 304 generally illustrates processes associated with the caster including animation sequences. The target channel 306 generally illustrates processes associated with the target including animation sequences. The object channel 308 illustrates the relative timing that an object is presented during the combat sequence. The general channel 310 illustrates the presentation of graphical elements associated with the duel and timing relative to the other channels. The camera channel 312 illustrates the timing of various camera moves and/or angles during the course of the dual relative to the other channels.

FIGS. 4A-F illustrates a pictorial chart 400 of the various stages in a duel. In this example, the chart 400 includes images 402-428 that illustrate various camera angles, graphical elements, actions, and/or other aspects that may be presented at various stages. The planning-phase image 402 illustrates two teams facing each other and surrounding an arena. The starting-phase image 404, the focus-stage image 406, and the target-stage image 408 include a graphical element underneath the first player to act. The casting-stage image 410 illustrates that the caster performs one or more actions in response to at least a user selecting a spell. The outgoing-stage image 412 illustrates an example of a hanging effect, in this case a 3D floating shield, in front of the caster. In the event the selected spell summons an object, the summon-stage image 414 and the bounce-stage image 416 illustrate that a 3D object is presented on the arena and faces the target. The incoming-stage image 418 illustrates a 3D floating shield in front of the target. The object-act-stage images 420 and 422 present an animation of the object acting on the target and the target's response to the hit. The release-stage image 424 illustrates that the summons object is released from the stage. The death-stage image 426 illustrates that a death animation is presented in response to at least the target dying. The ending-phase image 428 illustrates that the winning team is presented standing, while the losing team is lying on the ground.

Figure 5A:
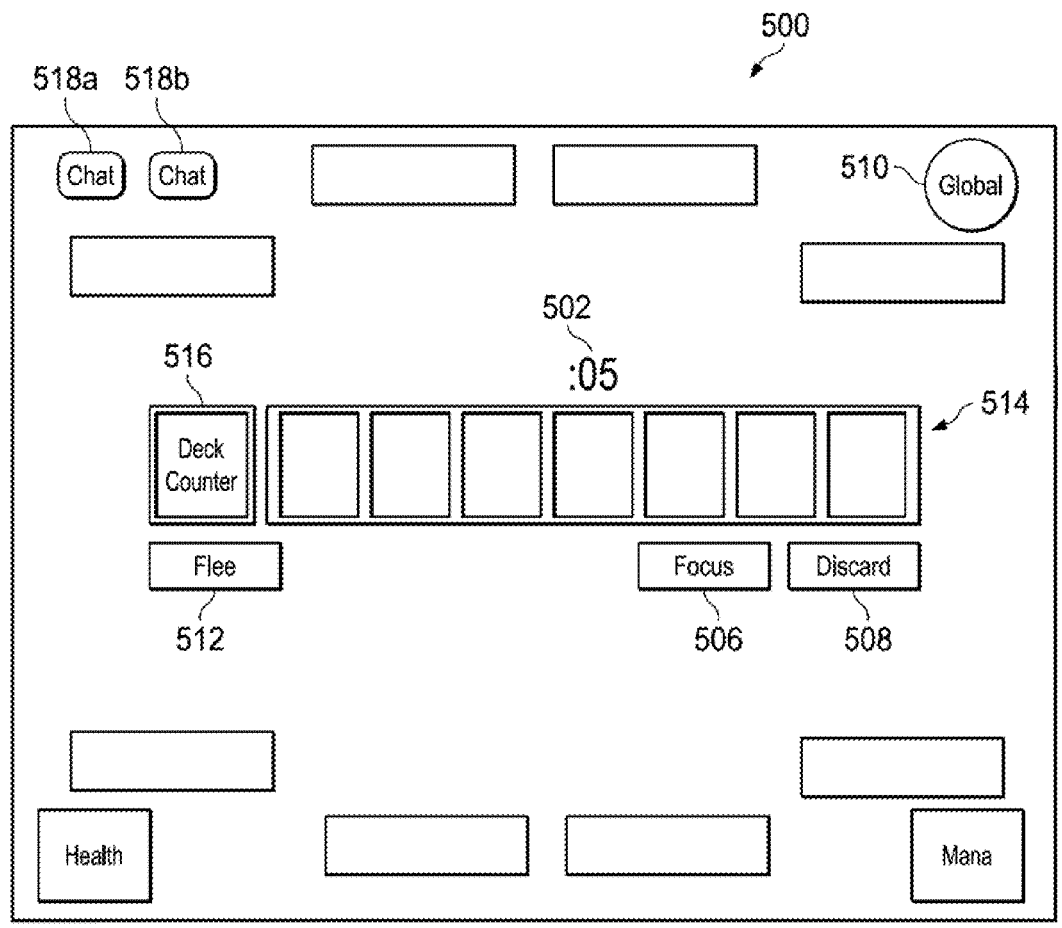
FIGS. 5A-D illustrate different display formats presented to a user during and after duels.

FIGS. 5A-D illustrate displays associated with combat. FIG. 5A illustrates an example interface 500 for a planning phase in accordance with some implementations of the present disclosure. The planning-phase interface 500 includes interactive graphical elements that enable a player to organize a strategy and execute plays such as selecting cards. For example, the interface 500 may include interactive elements that execute one or more of the following: cast a spell on a player; cast a global spell; cast a spell on another spell ("Enchantment"); discard a spell; pass; flee; chat; and/or others. In this example, the interface 500 includes a countdown timer 502, character-information tabs, focus button 506, discard button 508, global icon 510, flee button 512, hand 514, a deck counter 516, and chat windows 518a and 518b. The interface 500 is for example purposes only and a planning-phase interface may include some, all, or none of the illustrated interactive elements.

Countdown timer 502 may indicate the time available to the player to select an action. In some implementations, if all players make their selection before the end of the time period, the duel may immediately proceed to the execution phase before the timer counts down. The countdown timer 502 may be configurable by, for example, the game designer. In the event the timer runs down prior to one or more players making a selection, those players may not participate in that duel round. During the planning phase, a player may alter, update or otherwise modify selected actions if additional time is left on the timer 502. In some cases, a window may pop up indicating that other players are still making selections. In this case, a button may be presented including the selections "Go Back" or "Change." Selecting this button may return the player back to the planning phase interface 500 to enable a player to modify the selected actions. The timer 502 may not reset, and if a selection is not made in time, the player may default to 'pass' or Focus. The character information tabs may present information associated with a combatant in response to a user selection. The name tag may present the player's name or the team or monster name. The health min/max tab may present the current health level and the maximum health level of a player. The pips tab may present the power used to cast spells. In some implementations, each pip (e.g., yellow) or power pip (e.g., white with a tint of blue) may be displayed as separate graphical elements or numerically. The selected spell tab may presents icons representing a selected spell and a color of the player ring may be presented around the icon. In some implementations, a camera facing object that appears apart of the selected spell tab may be displayed above each player's head during the planning phase such as, for example, once each character has selected an action for the round. For example, the icon of that spell and a color of the target's ring around the icon may be presented.

The pass button 506 may be a graphical button that enables a player to skip this round and may result in the player gaining a pip or increase in power level. In some implementations, selecting the pass button 506 may end a player's turn and may prevent the player from changing the action. In some cases, the pass button 506 may be replaced with a change button that enables the player to change their selection. The discard button 508 may be a graphical button that enables a player to discard a selected spell. The discarded spell may be temporarily removed from this player's deck and may not be drawn again for the remainder of this combat. If the discarded spell is a treasure card, the discarded card may be temporarily removed from this player's deck of available cards and may not be drawn again for the remainder of this combat. In addition to the discard button 508, a player may discard a spell by, for example, right-clicking on the spell. The global icon 510 may be presented in the upper right hand corner of the planning phase interface 500. The icon 510 may indicate when a global spell is played and active. In some examples, the icon 510 may be presented only during the planning phase. To cast a global spell, a player may click or select the appropriate card. In some implementations, the 2D interface elements associated with invalid targets may be presented as gray, and the 3D representation of valid targets may be surrounded by a glow or light effect.

The flee button 512 may present a graphical button that may remove a player from combat and may send the player back to the hub zone of the world. In some implementations, a confirmation window may pop up such that clicking "Yes" may execute the actions. The hand 514 may present a variable number of cards such as, for example, 1 to 7. The presented cards may be drawn from a collective deck such as the cards in a player's Deck and any cards granted by equipment the player may be using or wearing. In some implementations, the hand 514 may present randomly selected spells drawn from the player's decks and may represent the player's hand and available to spells during the round. To cast a spell on another player, a player may click or select on the spell in the hand 514 and select the character information tab 504 of the target. In some implementations, invalid targets may be presented as grayed. If a valid target is selected, the spell may be displayed on a character box and a color around the spell matching the color of your target's box may be presented. To cast a spell on another spell, a player may click or select a spell and then click or select on a target spell card. In some implementations, invalid targets may be presented as gray. If a valid target is selected, the enchant card may disappear and the target spell may be marked visually as enchanted. The enchanted spell, after being played, may not be retrievable. In some examples, enchanted spells may not cost any pips to cast. In other words, the enchantment spells or other spells may have a rank of zero.

Figure 5B:
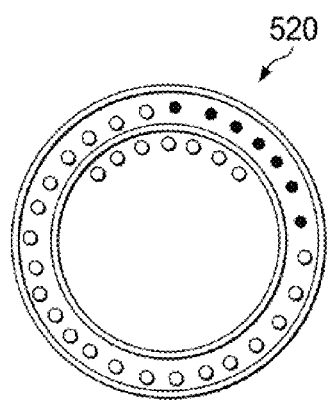

The deck counter 516 may indicate how many cards a player has left in their deck. The presented number may not include the cards presented in the hand 514. In some implementations, discarded cards may not be shuffled back into the deck until the next duel. The deck counter 516 may be formatted as "Deck X of Y" where X is the number of cards remaining and Y is the total configured cards plus treasure cards. For example, if the player had 30 cards configured in the deck, plus 15 treasure cards, the counter 516 may display "38 of 45" after the initial hand 514 is dealt. The chat windows 518*a* and 518*b* may present dialogue between players. For example, the entered text may appear in a bubble above their heads. The chat windows 518*a* and 518*b* may be an easy chat button and a secure chat button. FIG. 5B illustrates a graphical element 520 associated with health of a player. The player's health may be represented by glowing runes along the inner colored circle of the element 520 and the player may be presented as standing on the element 520. As the player takes damage during duels, the runes on the element 520 may be replaced with black dots, disappear or otherwise blacked out.

Figure 5C:
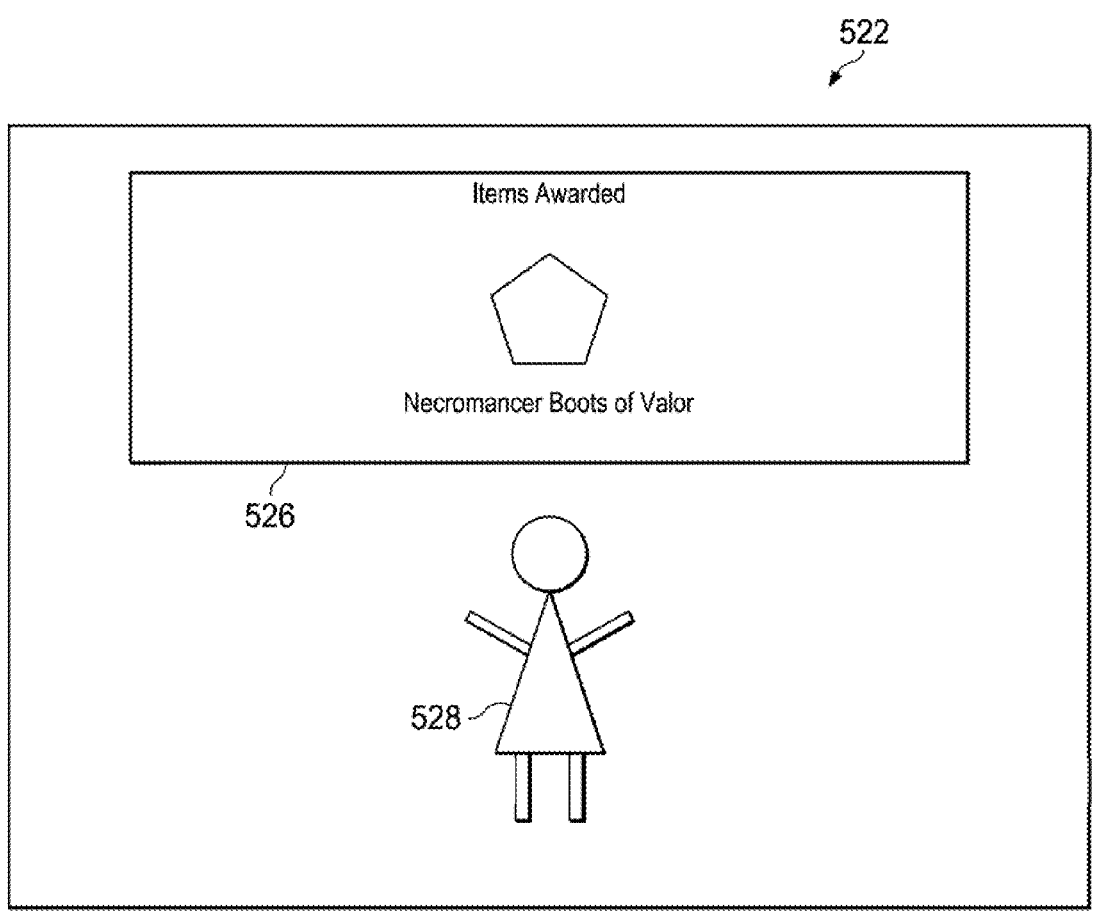
Figure 5D:
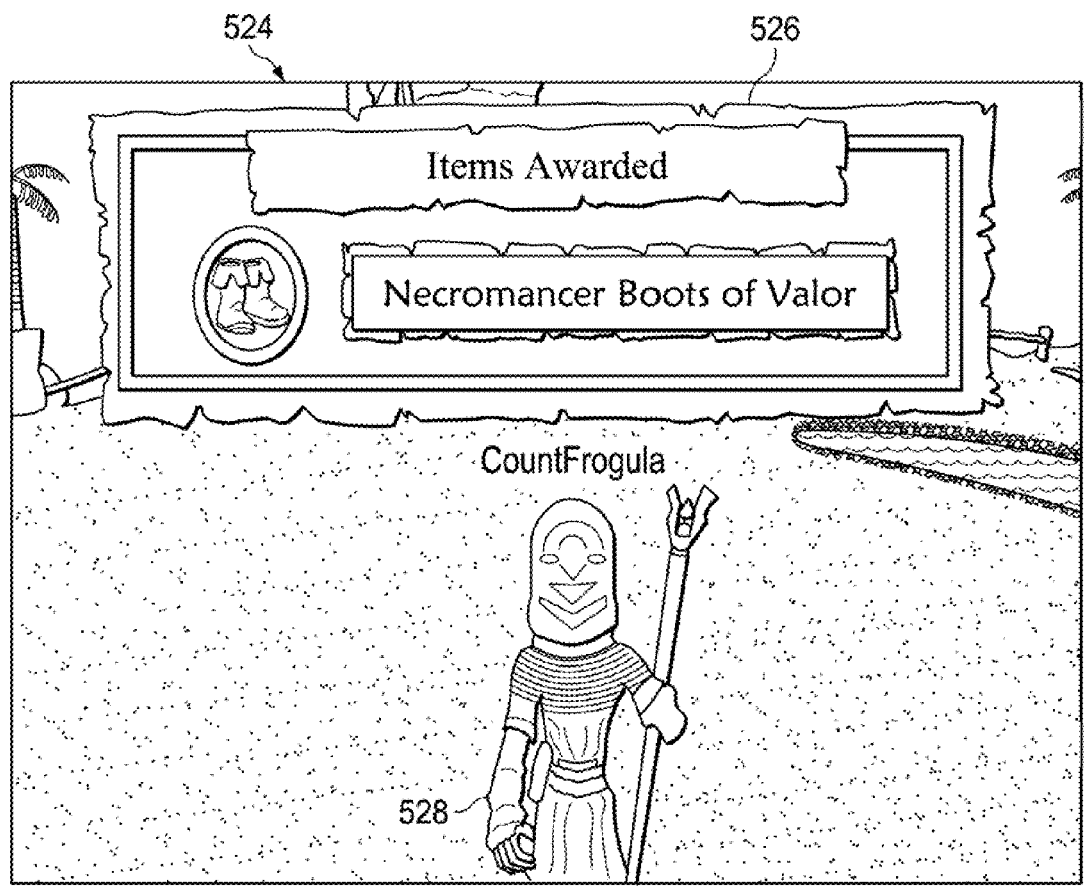

FIGS. 5C-D illustrate example format 522 and an example image 524 of a victory screen after a player has won a duel. The example format 522 includes a presentation of an award box 526 and a player 528. The award box 526 may include text and/or an image of an item award to a winning player. In this example, the award box includes the text "Items Awarded" and the name of the item "Necromancer Boots of Valor" with an image. In another example, the award box 526 may be replaced with a reward icon and floating text detailing the reward granted. In some implementations, if any players are left alive after combat, then these players may be presented with a victory screen in accordance with the format 522. In some cases, the camera may be focused on all players and a window appears in the upper portion of the screen. The players may be animated to perform one or more actions such as a victory dance. The award items may include gains, loot, gold, and/or other items. If player wasn't awarded loot, the player may not be presented such as format 526. Gold gained may be displayed in one lump sum to the players. In regards to equipment and gold, a 2D picture of the item(s) received may be presented such as those illustrated in image 528. If multiple items are received, these items may be presented one at a time, all at once, or other combinations. Gold may be represented as a gold coin followed by a number of pieces of gold received. When the victory phase ended, the player may regain control of his character.

Figure 6A:
FIGS. 6A-I examples images that convey information using icons.
Figure 6E:
Figure 6B:
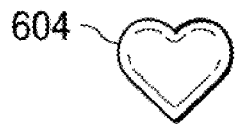
Figure 6F:
Figure 6C:
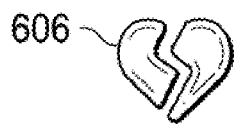
Figure 6G:
Figure 6D:
Figure 6H:
Figure 6I:
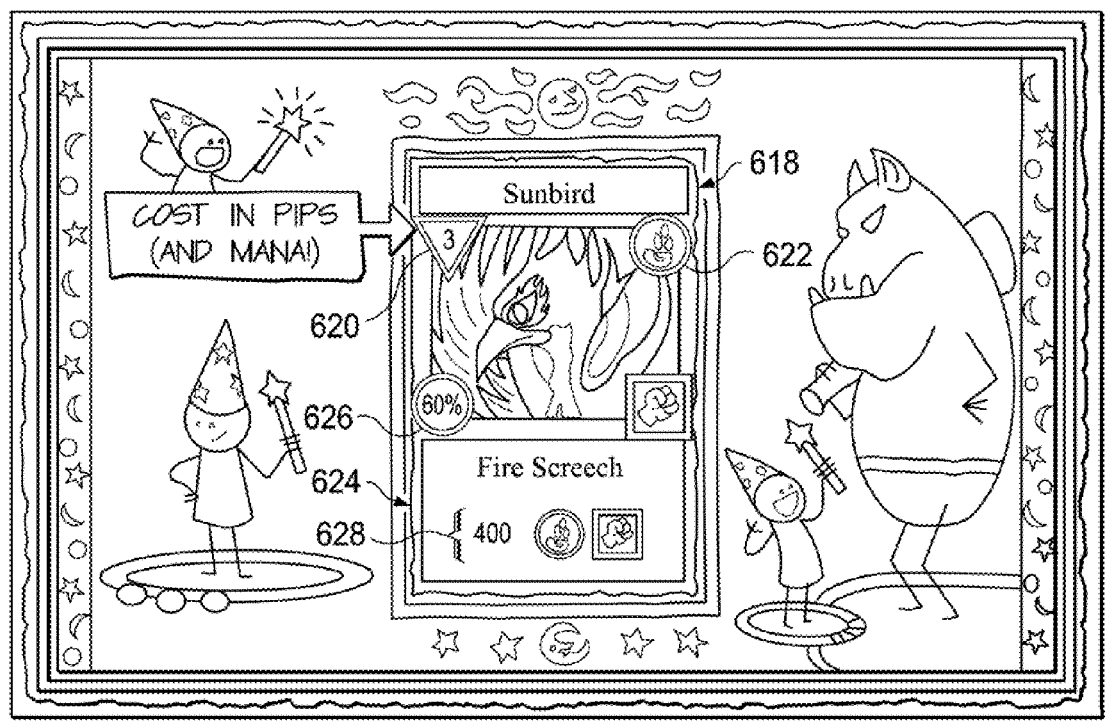

FIGS. 6A-I illustrate example icons 602-616 and an example spell card 618 that includes icons to indicate aspects of the spell. The icons 602-616 and the spell card 618 are for illustration purposes only and a gaming system may include some, all or none of the represented attributes or card format. Referring to FIG. 6A, the icon 602 illustrates a first and may be included on a damage card. Damage cards may inflict a certain amount and kind of damage depending on the card's school and opponent. Referring to FIG. 6B, the icon 604 illustrates a heart and may be included on healing cards. Healing cards may give players an ability to heal themselves and/or other players and/or friendly monsters. Referring to FIG. 6C, the icon 606 illustrates a broken heart and may be included on health drain cards. Health drain cards may inflict a certain amount of damage and some portion of the amount may be added to the caster's health points. Referring to FIG. 6D, the icon 608 illustrates a shield and, when used during combat, may reduce the damage of either outgoing or incoming spells of one or more damage types by a certain percentage, which may depend on the spell. In some implementations, these cards may cost 0 pips. Referring to FIG. 6E, the icon 610 illustrates a four-leaf clover and may be included in charm or curse cards. Charm and curse spells may increase or decrease the overall damage, healing, or accuracy of outgoing spells by a certain percentage or fixed amount. Shield and trap spells may increase or decrease the overall damage or healing of incoming spells by a certain percentage or fixed amount. In some implementations, these cards may cost 0 pips. Referring to FIG. 6F, the icon 612 illustrates a spiral and may be included in global spell cards. Global spell cards may act similarly to charms or curses except they may cost more pips, may last for the duration of the battle, and/or may affect all participants in the duel. Referring to FIG. 6G, the icon 614 illustrates an open hand and may be include on manipulation cards. Manipulation cards may serve a variety of purposes. For example, manipulation cards may summon friendly monsters, may make your opponent reshuffle his/her deck, or may give pips to other players. Referring to FIG. 6H, the icon 616 illustrates a star and may be included in enchantment cards. Enchantment cards may attach to regular cards to improve or modify their effect, or turn one spell card into a different spell card. In some cases, once an enchantment card is attached to a regular card, a new treasure card may be created. Referring to FIG. 6I, the card 618 is an example playing card that represents a spell and aspects of the spell are indicated on the face of the card. The example card 618 includes a pip field 620, a school icon 622, type icon 624, an odds field 626, and effect field 628. The pip field 620 indicates that the spell costs 3 pips to play. The school icon 622 indicates that the spell is from the fire school. The type icon 624 indicates that the spell is a damage spell. The odds field 626 indicates that the probability of hitting the target is 60%. The effect field 628 indicates "400 (Fire Symbol) (Damage Symbol)" and may mean that this spell will do 400 Fire Damage.

Figure 7A:
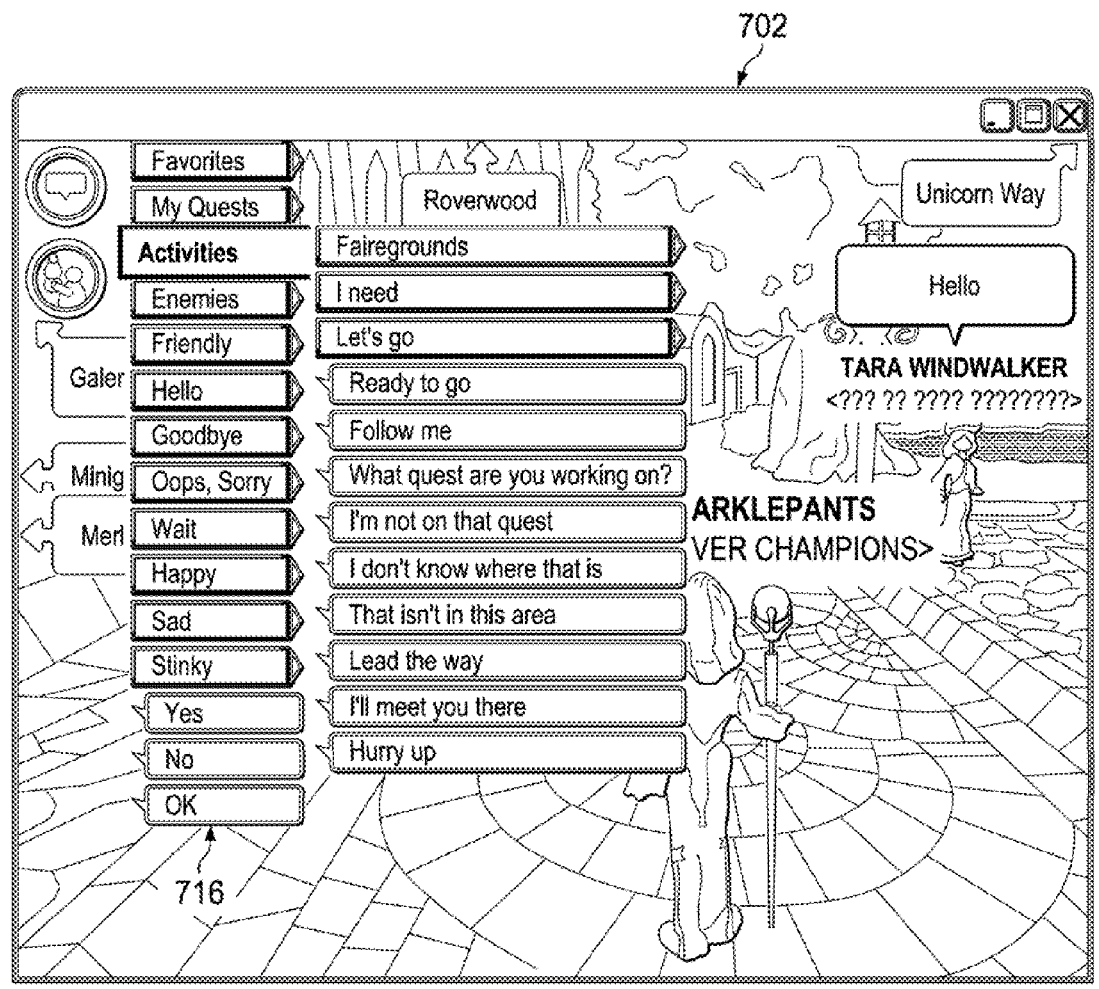
FIGS. 7A-G illustrate example displays associated with one or more aspects of exchanging dialogue between players.
Figure 7B:
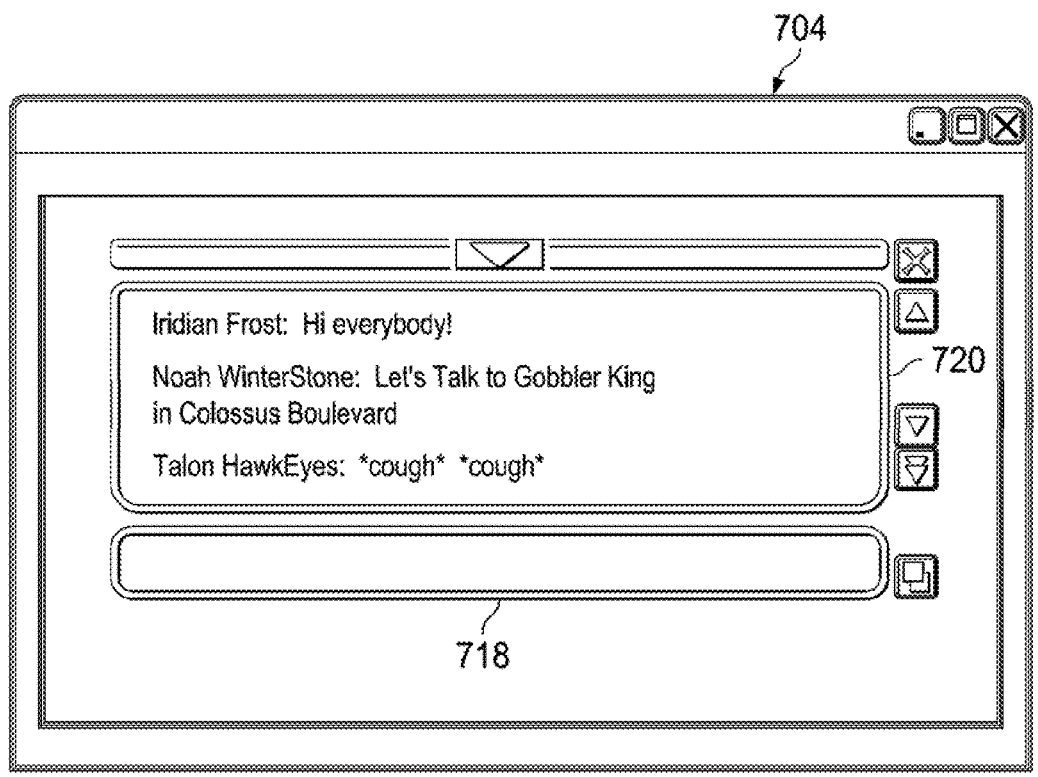

FIGS. 7A-G illustrate example displays 702-712 associated with one or more aspects of exchanging dialogue between players. Referring to FIG. 7A, the display 702 illustrates an example of menu chat. In this example, players select a word or phrase from the menu 716, and in response to the selection, a bubble may present the selected text above the player's head. In some implementations, the menu 716 may include a list of categories such as activities or happy, and if the category is selected, then a plurality of different selectable phrases and/or emote animations may be presented to the player. Referring to FIG. 7B, the display 704 illustrates an example of open chat. In this example, players type in words in the text box 718, and in response to a selection (e.g., pressing enter), the words are presented in the dialogue field 720. In some implementations, open chat may include the following restrictions set as default: under 13 players are restricted to Easy Chat only; 13-18 year olds have filtered chat based on the white and black lists discussed with respect to FIG. 1; 18+ year olds get open chat with only a profanity filter; and/or others. The profanity filter may be built of two lists, substring and exception. In some implementations, any word containing the substring is filtered and any word containing the substring that appears in the exception list is allowed. For example, the string "Ass" is a substring match but "!grass" and "!assassin" are allowed exceptions.

Figure 7C:
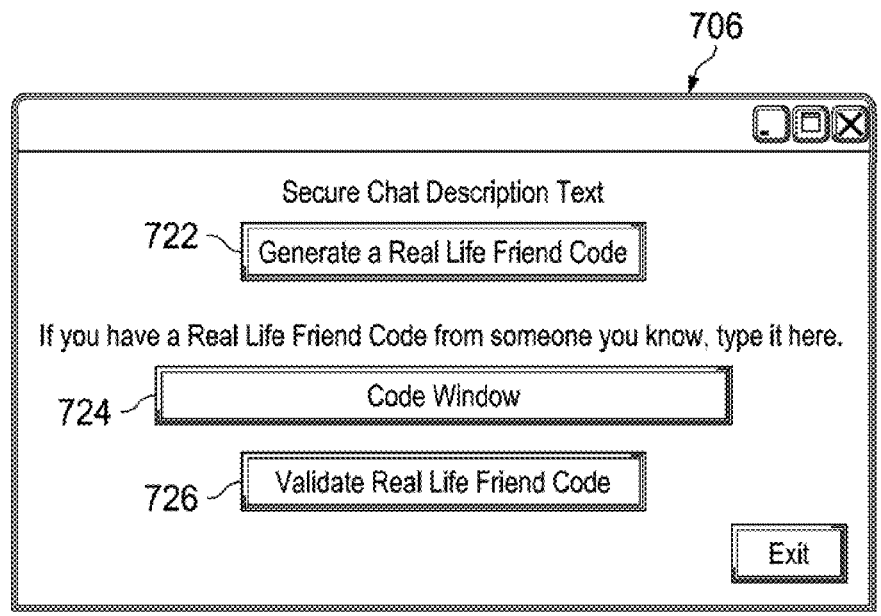
Figure 7D:
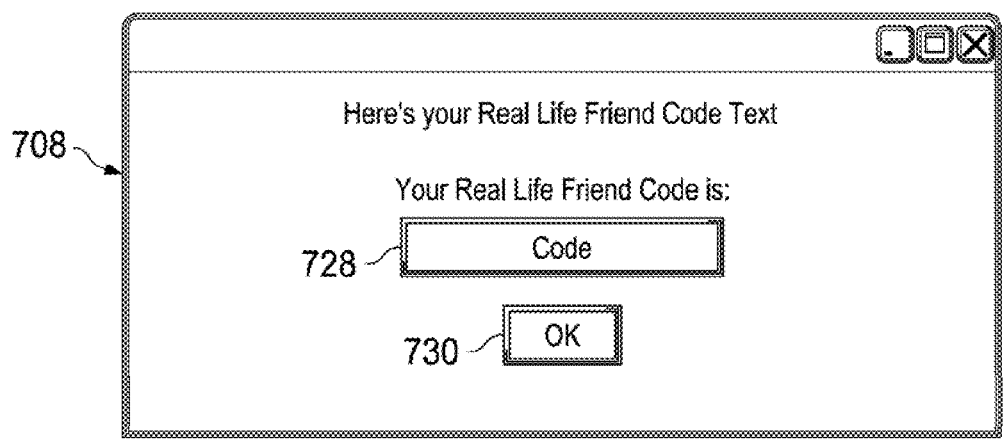
Figure 7E:
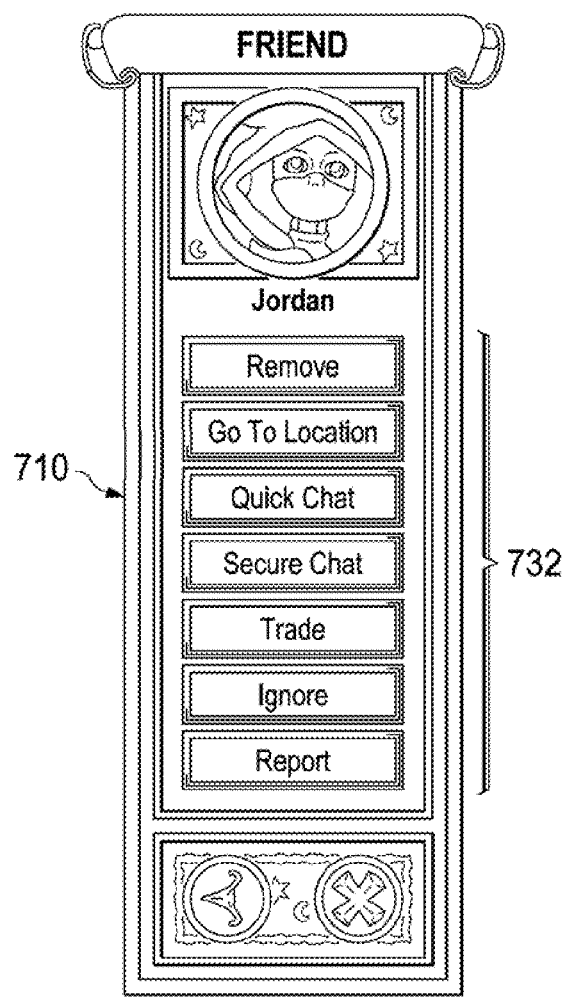

FIG. 7C is a display 706 illustrating an example format associated with secure chat between friends. The display 706 includes a generate button 722, a code window 724, and a validation button 726. In response to a player selecting the generate button 722, the display 708 in FIG. 7D may be presented to the user indicating a suggested friend code 728 and "OK" button 730 to accept the friend code. In some implementations, the real life friend code 728 may only work once since after the first use the code will no longer work. In addition, the code may have a limited lifespan (e.g., 2 days). The code window 724 receives a friend code enter by the user, and the validation button 726, when selected, initiates a validation process for the enter code. In the event the validation process fails, an error message may be presented such as "That is not a valid code, please try again!" In the event of validation, a success message may be presented such as a success message. "You are now Real-Life Friends with [Friend's Name]!" In general, secure chat may provide a free chatting environment, but the players should typically know each other in the outside world to be able to activate secure chat. In some implementations, secure chart does note filter dialogue based on the white list. The dialogue may be filtered through a profanity filter instead of the black list. After a friend has been validated, a user may select one of a plurality of different selectable actions from the menu 732 in the display 710 of FIG. 7E. For example, the player may select secure chat with the friend from the menu 732.

Figures 7F, 7G:
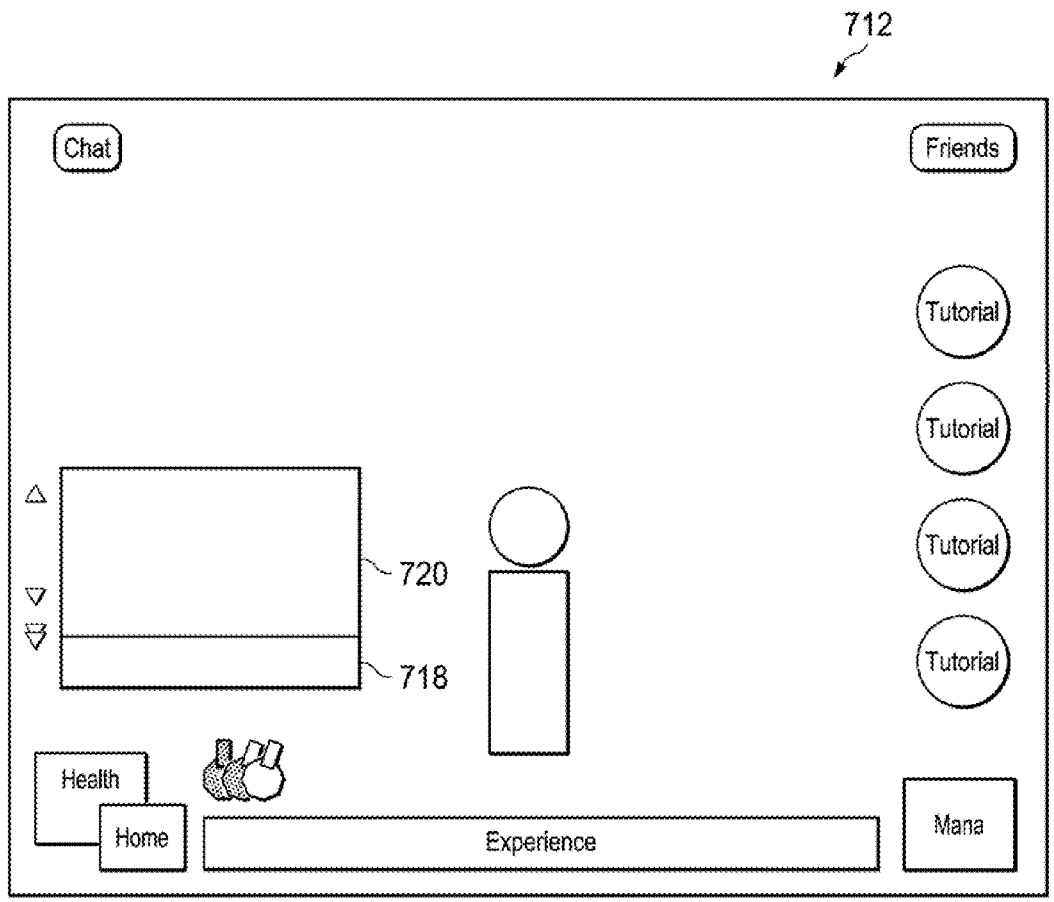

FIG. 7F is display 712 illustrating one possible position of a chat window 720 and a chat line 718 relative to other aspects of the screen; although it will be understood that various windows may be dragged, re-sized, etc. by user input. The chat window 720 may present dialogue. In some cases, word wrap may be used and new chat may be displayed at the bottom of the window 720. Hidden text may be scrolled through. In some implementations, single arrows proximate the window 720 may be used to scroll through text line by line. The double arrow may return to the bottom of the displayed chat. In the event that new dialogue has been posted when scrolling through older text, the double arrow may flash indicating the new text. To post text, players may enter text in chat line 718 then, for example, press enter. If a player receives a tell, pressing the R key may open the chat line 718 and present a reply tag [Reply to <Name>] in preparation to send a reply. Referring to FIG. 7G, the table 714 illustrates the different formats for the different types of chat. For example, the table 714 includes a text color column indicating that chat may appear in different colors. For example, easy chat or filtered chat may appear in white text. A private message (Whisper/Tell) may appear as light purple. Secure chat may appear as light green. In addition, the table 714 includes a display column indicating that different chat may be displayed differently. For example, easy chat or filtered chat may be displayed as "[Name] says: [Text]". A received whisper may be displayed as "[Name] whispers: [Text]". A sent whisper may be displayed as "To [Name]: [Text]".

While this specification contains many specifics, these should not be construed as limitations on the scope of the invention or of what may be claimed, but rather as an exemplification of preferred embodiments of the invention. Certain features that are described in this specification in the context of separate embodiments may also be provided in combination in a single embodiment. Conversely, various features that are described in the context of a single embodiment may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter has been described in terms of particular variations, but other variations can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

The preceding figures and accompanying description illustrate processes and implementable techniques. But system 100 (or its other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously and/or in different orders than as shown. Moreover, system 100 may use processes with additional steps, fewer steps, and/or different steps, so long as the methods remain appropriate.

In other words, although this disclosure has been described in terms of certain implementations and generally associated methods, alterations and permutations of these implementations and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer implemented method for chatting in an online game using computer-readable instructions, comprising:

identifying each of a plurality of characters in the online game and an associate chat level from a plurality of different chat levels, wherein each chat level is assigned at least one rule different from rules assigned to other chat levels;

receiving dialogue from a player controlling one of the plurality of characters, wherein players different from the player are each associated with a chat level from the plurality of different chat levels;

identifying, for each of the players different from the player, one or more rules assigned to the associate chat level; and filtering, for each of the players different from the player, the received dialogue based, at least in part, on the one or more rules assigned to the associate chat level, wherein different chat layers filter the received dialogue differently.

2. The method of claim 1, wherein filtering comprises:
identifying an entered word as a word to remove prior to presentation to other characters; and
dynamically updating the word selected for removal with an approved word for presentation to other characters in a virtual world.

3. The method of claim 1, wherein filtering the received dialogue comprises:
comparing the received dialogue to a list of profane terms associated with one or more specified chat levels; and
replacing prohibited terms with character strings prior to presenting the dialogue to other characters in the one or more specified chat levels.

4. The method of claim 1, for each of the plurality of characters present a graphical element indicating a chat level associated with the player.

5. The method of claim 1, wherein filtering the received dialogue comprises:
comparing the received dialogue to a list of unacceptable terms associated with a particular chat level;
dynamically updating one or more attributes of the received dialogue based, at least in part, on the received dialogue matching the acceptable terms so that a particular player can view the unacceptable term in real-time; and
automatically presenting filtered text, based on the unacceptable term, to other players as the dialogue is received from the particular player.

6. The method of claim 5, one updated attribute including a new color for the unacceptable term.

7. The method of claim 1, further comprising:
presenting filtered dialogue to other characters proximate one of the plurality of characters in a virtual world;
determining a change in proximity between the other characters and the one of the plurality of characters in the virtual world; and
dynamically updating a presentation of the filtered dialogue in response to at least the change in the proximity.

8. The method of claim 7, further comprising:
identifying expressions for transforming the filtered dialogue based on proximity between characters in the virtual world; and
switching presented dialogue between a field proximate, a speaking character, and a border of graphical user interface presenting the virtual world in accordance with the rules and change in proximity.

9. The method of claim 1, further comprising:
identifying, for each of the plurality of characters, other characters within a specified range; and
presenting the filter dialogue to the other characters within the specified range for each of the plurality of characters.

10. The method of claim 1, further comprising:
identifying a dialogue type associated with the filter dialogue; and
presenting the filtered dialogue to other characters based, at least in part, on the dialogue type.

11. A computer program product for chatting in an online game using computer-readable instructions, the computer program product stored on a non-transitory computer-readable storage medium and comprising instructions operable when executed to cause a processor to:

identify each of a plurality of characters in the online game and an associate chat level from a plurality of different chat levels, wherein each chat level is assigned at least one rule different from rules assigned to other chat levels;

receive dialogue from a player controlling one of the plurality of characters, wherein players different from the player are each associated with a chat level from the plurality of different chat levels;

identify, for each of the players different from the player, one or more rules assigned to the associate chat level; and filter, for each of the players different from the player, the received dialogue based, at least in part, on the one or more rules assigned to the associate chat level, wherein different chat layers filter the received dialogue differently.

12. The computer program product of claim 11, wherein filtering comprises:
identifying an entered word as a word to remove prior to presentation to other characters; and
dynamically updating the word selected for removal with an approved word for presentation to other characters in a virtual world.

13. The computer program product of claim 11, wherein filtering the received dialogue comprises:
comparing the received dialogue to a list of profane terms associated with one or more specified chat levels; and
replacing prohibited terms with character strings prior to presenting the dialogue to other characters in the one or more specified chat levels.

14. The computer program product of claim 11, for each of the plurality of characters present a graphical element indicating a chat level associated with the player.

15. The computer program product of claim 11, wherein filtering the received dialogue comprises:
comparing the received dialogue to a list of unacceptable terms associated with a particular chat level;
dynamically updating one or more attributes of the received dialogue based, at least in part, on the received dialogue matching the acceptable terms so that a particular player can view the unacceptable term in real-time; and
automatically presenting filtered text, based on the unacceptable term, to other players as the dialogue is received from the particular player.

16. The computer program product of claim 15, one updated attribute including a new color for the unacceptable term.

17. The computer program product of claim 11, further comprising:
- presenting filtered dialogue to other characters proximate one of the plurality of characters in a virtual world;
- determining a change in proximity between the other characters and the one of the plurality of characters in the virtual world; and
- dynamically updating a presentation of the filtered dialogue in response to at least the change in the proximity.

18. The computer program product of claim 17, further comprising:
- identifying expressions for transforming the filtered dialogue based on proximity between characters in the virtual world; and
- switching presented dialogue between a field proximate, a speaking character, and a border of graphical user interface presenting the virtual world in accordance with the rules and change in proximity.

19. The computer program product of claim 11, further comprising:
- identifying, for each of the plurality of characters, other characters within a specified range; and
- presenting the filter dialogue to the other characters within the specified range for each of the plurality of characters.

20. The computer program product of claim 11, further comprising:
- identifying a dialogue type associated with the filter dialogue; and
- presenting the filtered dialogue to other characters based, at least in part, on the dialogue type.

* * * * *